July 20, 1965 L. P. HORWITZ ETAL 3,195,396
OPTICAL SPECIMEN IDENTIFICATION FILTERING TECHNIQUES
Filed Oct. 24, 1960 20 Sheets-Sheet 1
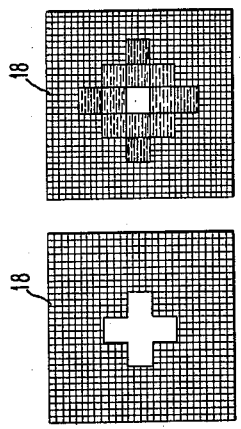
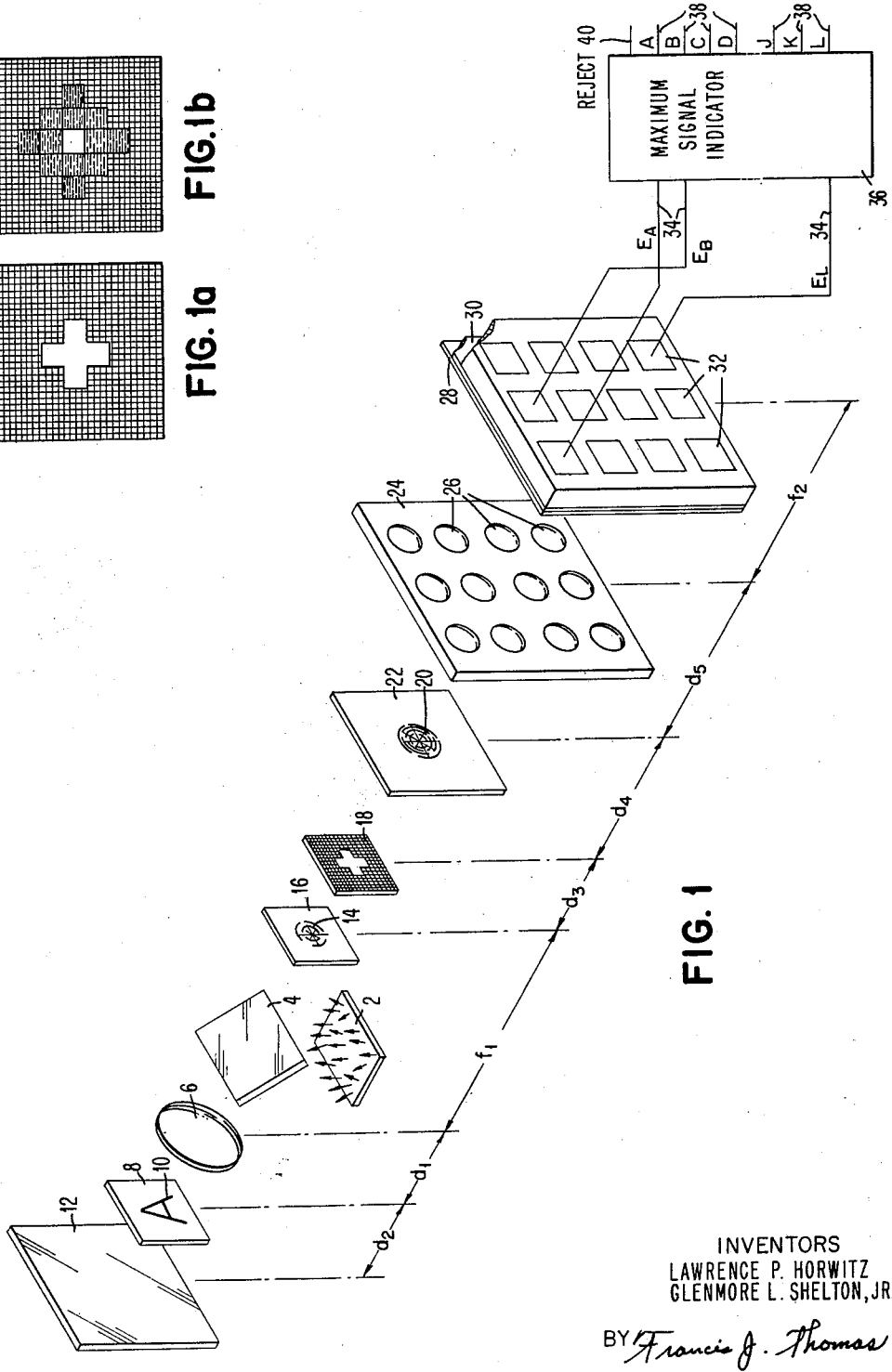
INVENTORS
LAWRENCE P. HORWITZ
GLENMORE L. SHELTON, JR.
BY Francis J. Thomas
ATTORNEY July 20, 1965 L. P. HORWITZ ETAL 3,195,396
OPTICAL SPECIMEN IDENTIFICATION FILTERING TECHNIQUES
Filed Oct. 24, 1960 20 Sheets-Sheet 2

FRAUNHOFER PLANE AVERAGING FILTER

FRAUNHOFER PLANE
SECOND-DIFFERENCE FILTER

FIG.5

July 20, 1965 L. P. HORWITZ ETAL 3,195,396
OPTICAL SPECIMEN IDENTIFICATION FILTERING TECHNIQUES
Filed Oct. 24, 1960 20 Sheets-Sheet 6
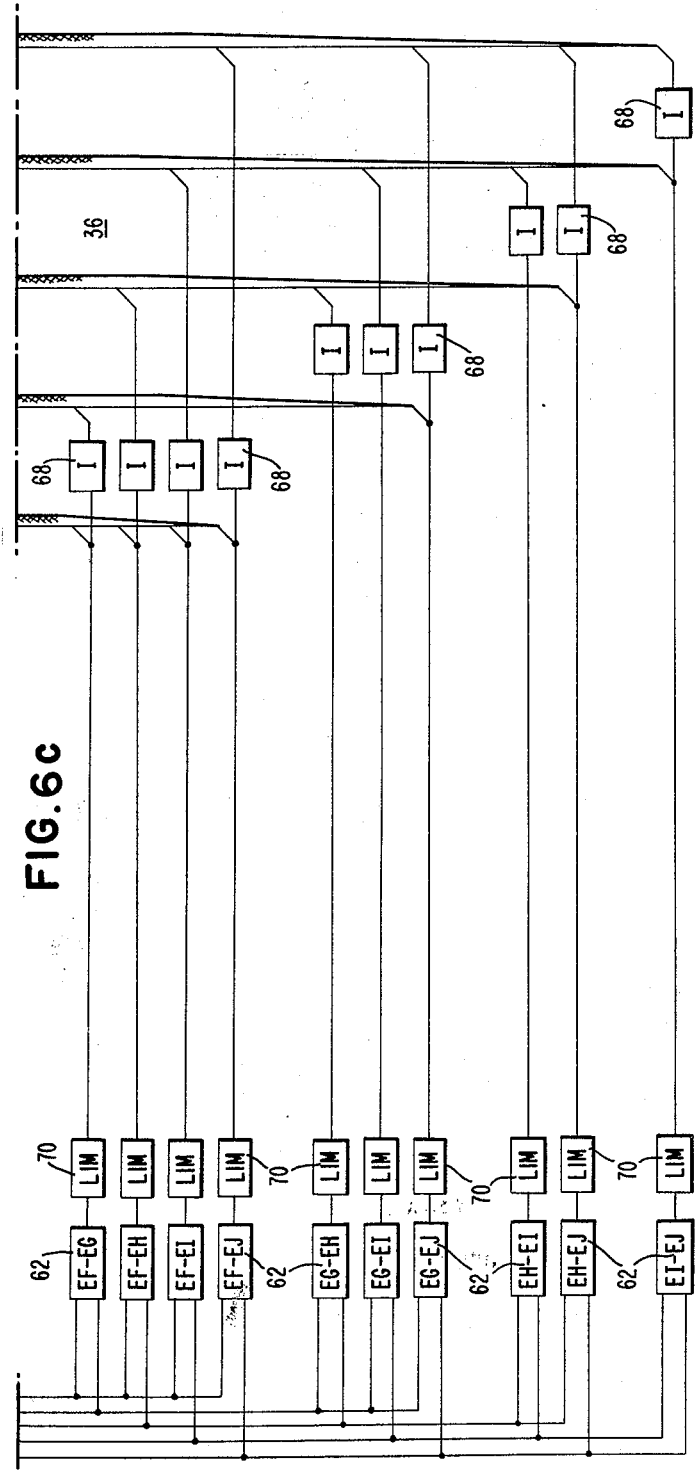
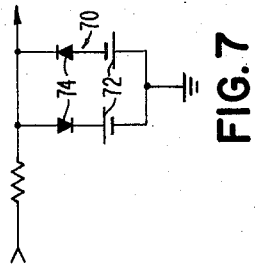
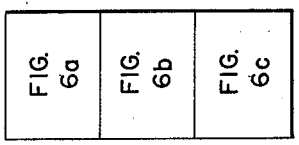

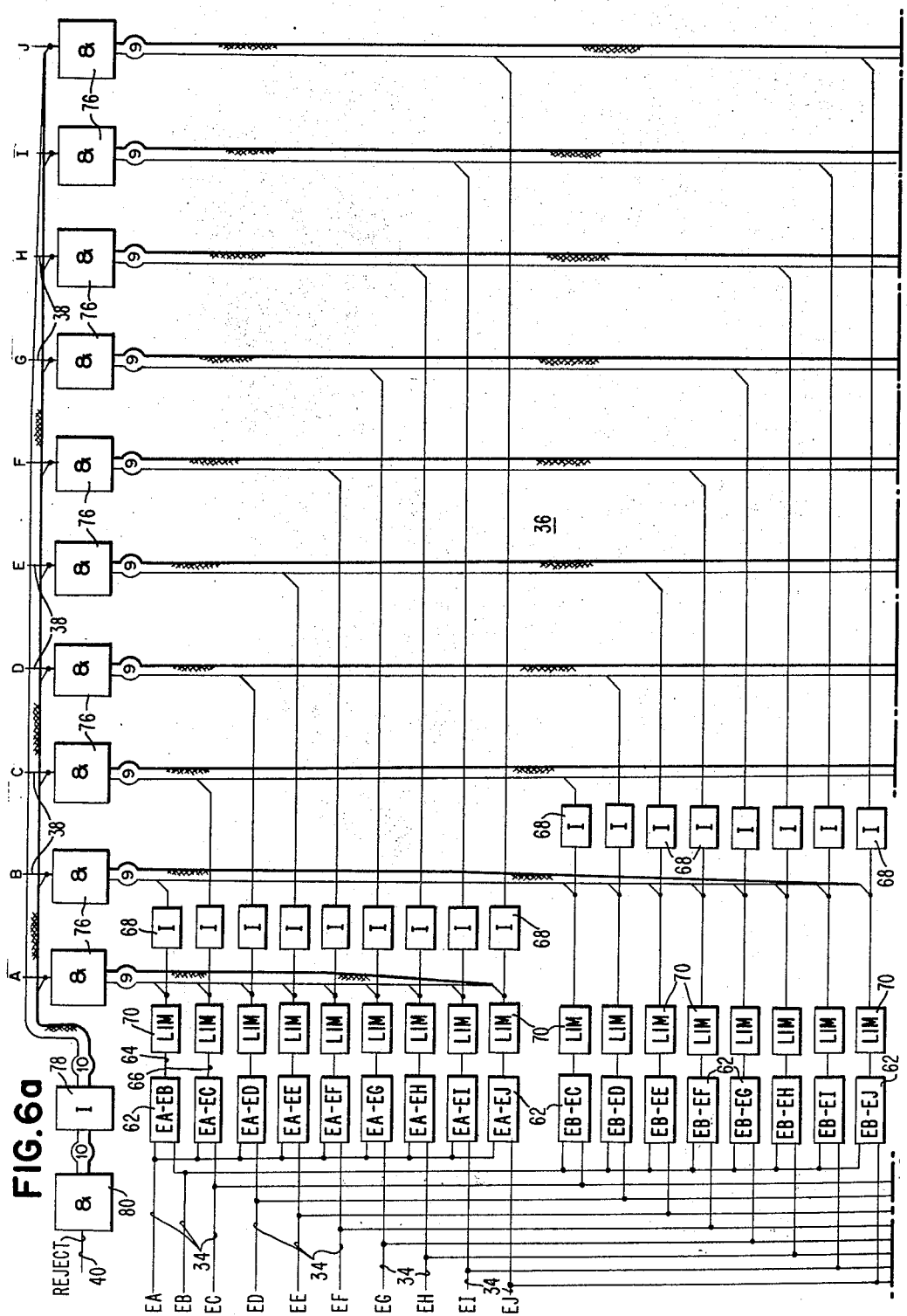

REFERENCE PATTERNS
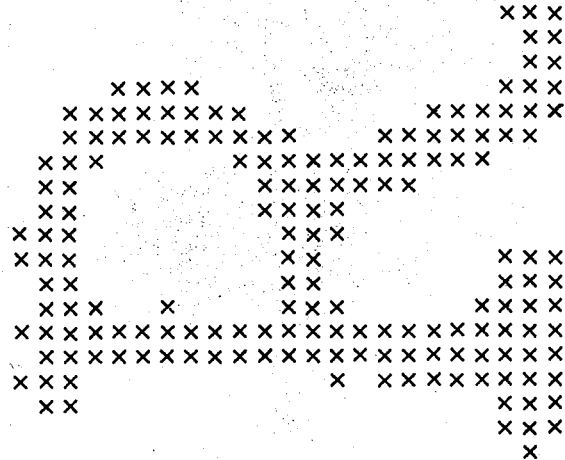
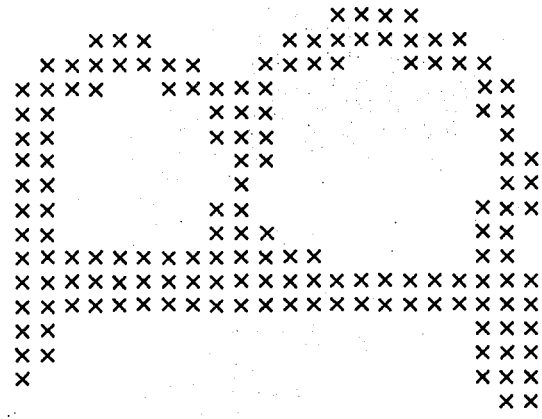
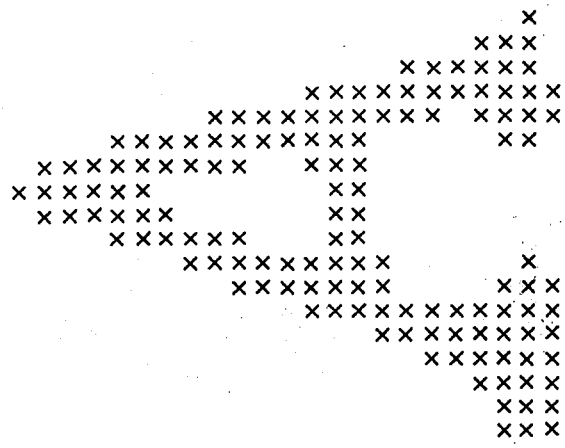
FIG. 8

July 20, 1965  L. P. HORWITZ ETAL  3,195,396
OPTICAL SPECIMEN IDENTIFICATION FILTERING TECHNIQUES
Filed Oct. 24, 1960  20 Sheets-Sheet 10

REFERENCE "A"
AUTOCORRELATION PATTERN

REFERENCE "B"
AUTOCORRELATION PATTERN

REFERENCE "R"
AUTOCORRELATION PATTERN

REFERENCE "A"
AUTOCORRELATION PATTERN
(AVERAGING FILTER)

REFERENCE "B"
AUTOCORRELATION PATTERN
(AVERAGING FILTER)

REFERENCE "A"
AUTOCORRELATION PATTERN
(SECOND-DIFFERENCE FILTER)

July 20, 1965  L. P. HORWITZ ETAL  3,195,396
OPTICAL SPECIMEN IDENTIFICATION FILTERING TECHNIQUES
Filed Oct. 24, 1960  20 Sheets-Sheet 17

REFERENCE "B"
AUTOCORRELATION PATTERN
(SECOND-DIFFERENCE FILTER)

July 20, 1965 L. P. HORWITZ ETAL 3,195,396
OPTICAL SPECIMEN IDENTIFICATION FILTERING TECHNIQUES
Filed Oct. 24, 1960 20 Sheets-Sheet 18

REFERENCE "R"
AUTOCORRELATION PATTERN
(SECOND-DIFFERENCE FILTER)

July 20, 1965    L. P. HORWITZ ETAL    3,195,396
OPTICAL SPECIMEN IDENTIFICATION FILTERING TECHNIQUES
Filed Oct. 24, 1960    20 Sheets-Sheet 19
TEST PATTERNS
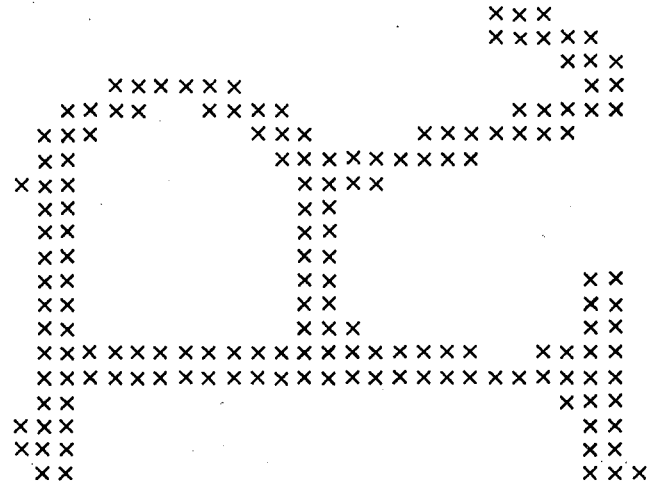
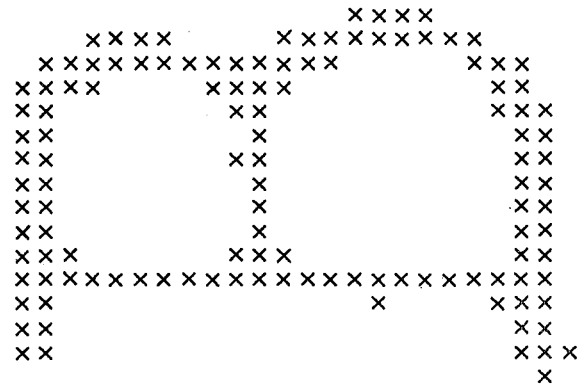
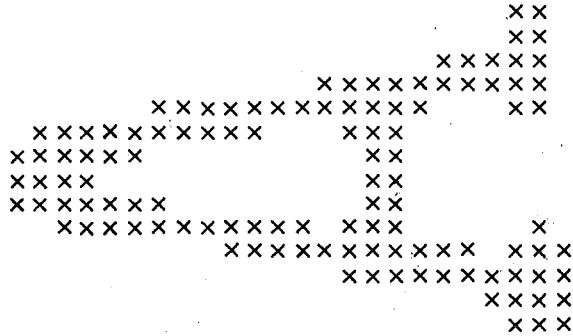
FIG. 18

FIG. 19

UNFILTERED

| SPECIMEN | | TO REF. A | TO REF. B | TO REF. R |
|---|---|---|---|---|
| REFERENCE | A | 1.000 | 0.930 | 0.931 |
| | B | 0.930 | 1.000 | 0.982 |
| | R | 0.931 | 0.982 | 1.000 |
| TEST | A | 0.944 | 0.923 | 0.925 |
| | B | 0.877 | 0.966 | 0.948 |
| | R | 0.864 | 0.934 | 0.936 |

AVERAGING FILTER

| SPECIMEN | | TO REF. A | TO REF. B | TO REF. R |
|---|---|---|---|---|
| REFERENCE | A | 1.000 | 0.941 | 0.940 |
| | B | 0.941 | 1.000 | 0.987 |
| | R | 0.940 | 0.987 | 1.000 |
| TEST | A | 0.953 | 0.935 | 0.936 |
| | B | 0.897 | 0.975 | 0.962 |
| | R | 0.879 | 0.944 | 0.947 |

SECOND-DIFFERENCE FILTER

| SPECIMEN | | TO REF. A | TO REF. B | TO REF. R |
|---|---|---|---|---|
| REFERENCE | A | 1.000 | 0.493 | 0.525 |
| | B | 0.493 | 1.000 | 0.700 |
| | R | 0.525 | 0.700 | 1.000 |
| TEST | A | 0.571 | 0.532 | 0.545 |
| | B | 0.437 | 0.696 | 0.579 |
| | R | 0.474 | 0.655 | 0.575 |

CORRELATION TABLES

United States Patent Office 3,195,396
Patented July 20, 1965

3,195,396
OPTICAL SPECIMEN IDENTIFICATION
FILTERING TECHNIQUES
Lawrence P. Horwitz, Chappaqua, and Glenmore L. Shelton, Jr., Mahopac, N.Y., assignors to International Business Machines Corporation, New York, N.Y., a corporation of New York
Filed Oct. 24, 1960, Ser. No. 64,568
22 Claims. (Cl. 88—1)

This invention relates to optical specimen identification techniques and in particular, to optical filtering techniques used in specimen identification devices.

Optical specimen identification devices at the present state of the art generally make use of direct comparison between the specimen to be identified and reference patterns and are affected by vertical and horizontal misregistration of the specimen. Efforts have been directed in the art to approaches wherein the specimen is examined and identified on criteria that are independent of the registration of the specimen and the details of its shape. The use of Fraunhofer diffraction patterns which are inherently registration invariant in a specimen identification system is shown in an application, Serial Number 29,392, filed May 16, 1960, now Patent No. 3,064,519, and assigned to the assignee of the present invention. The use of optical autocorrelation patterns, which are also inherently registration invariant, in a specimen identification system are shown in an application, Serial Number 45,034, filed July 25, 1960 and assigned to the assignee of the present invention. Optical filtering techniques that are usable in the field of registration invariant optical specimen identification to enhance their operation form the basis of the present invention.

In accordance with the invention, registration invariant optical specimen identification patterns may be improved with two basic types of filters: smoothing filters and discriminating filters. Smoothing filters tend to cancel the effects of specimen irregularities and are especially useful in a system for identifying multi-font specimens which have differences in detail but where identification depends on a general shape. Discriminating filters on the other hand tend to exaggerate the effect of specimen details and are especially use in a single-font system for identifying various similar-shaped specimens differing in minor details such as "A," "B," and "R"; "O" and "Q"; and "5" and "S." An example of the smoothing type of filter is known as the "averaging" filter; and an example of the discriminating type of filter is known as the "second-difference" filter. Both of these examples are shown and described in detail in optical specimen identification apparatus.

A primary object of this invention is to teach the use of optical filtering techniques in registration invariant optical specimen identification systems.

Another object of this invention is to teach the use of optical filters in registration invariant optical specimen identification systems to accentuate specimen particulars.

One object is to show the use of optical smoothing filters including averaging filters in a specimen identification system.

Another object is to show the use of optical discriminating filters including second-difference filters in a specimen identification system.

A more particular object is to show the use of optical filters to enhance the operation of specimen identification systems using Fraunhofer diffraction pattern comparison.

A second more particular object is to show the use of optical filters to enhance the operation of specimen identification systems using autocorrelation pattern comparison.

These and other objects are achieved by placing filters in optical specimen identification systems to modify the otherwise-obtained optical specimen patterns, and then comparing the filtered specimen pattern with similarly modified reference patterns. Alternative techniques accomplish the same result by either incorporating the filtering effect in the comparison reference pattern or by incorporating the reference pattern modification in the filter.

The foregoing and other objects, features and advantages of the invention will be apparent from the following more particular description of preferred embodiments of the invention, as illustrated in the accompanying drawings.

In the drawings:

FIGURE 1 is a functional diagram of an optical specimen identification system utilizing autocorrelation pattern comparison as modified by a positive filter function.

FIGURES 1a and 1b are diagrams showing typical optical filters that may be used in the embodiment of FIGURE 1.

FIGURE 5 is a diagram of a type of discriminating filter, the second-difference filter, to be used in a specimen identification system using Fraunhofer diffraction pattern comparison.

Figure 2A:
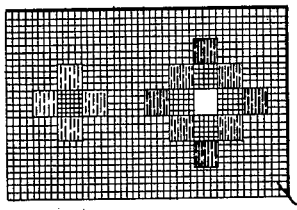
FIGURE 2a is a diagram showing typical optical filters that may be used in the embodiment of FIGURE 2.
Figure 2:
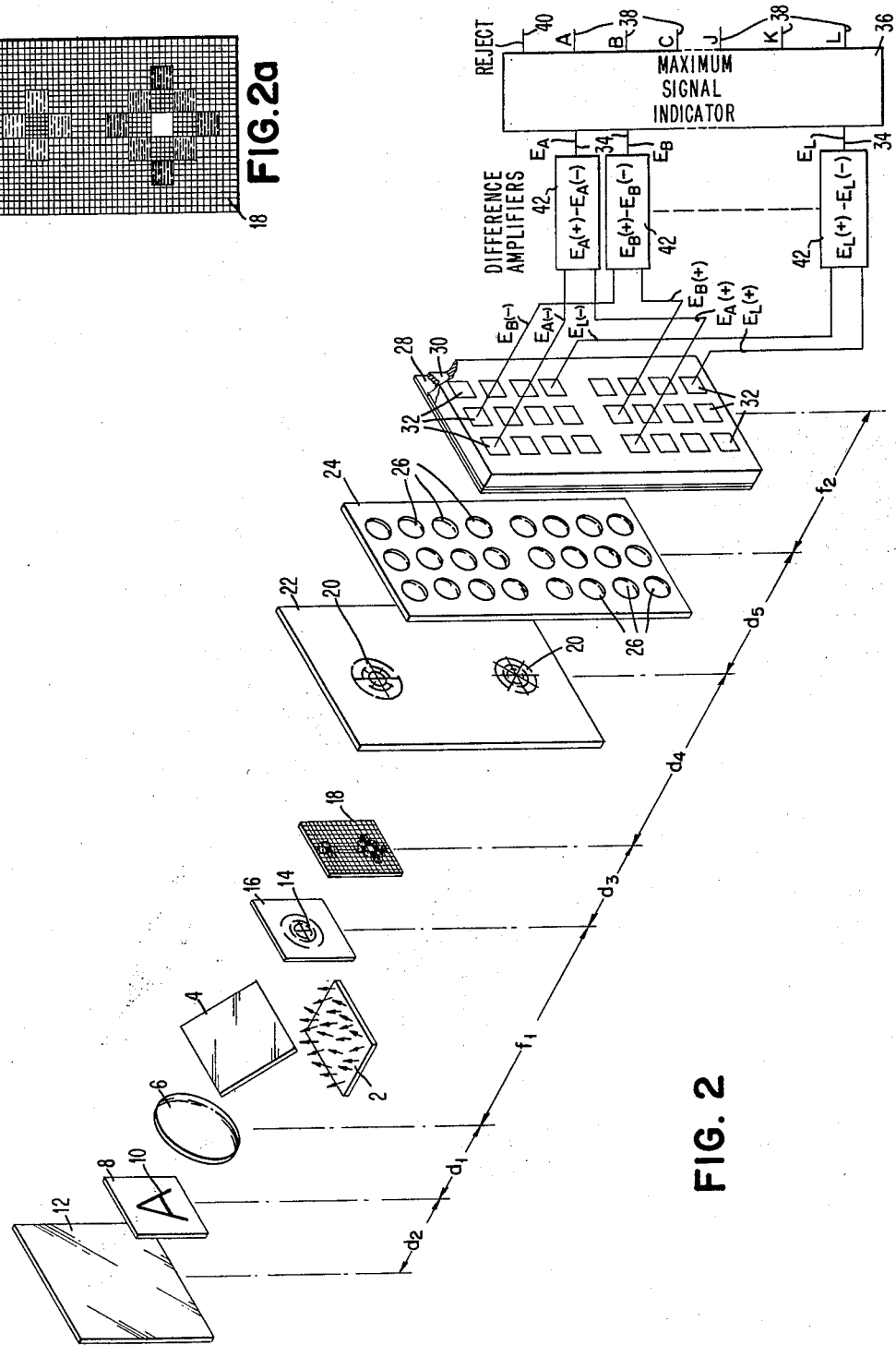
FIGURE 2 is a functional diagram of an optical specimen identification system utilizing autocorrelation pattern comparison as modified by a bi-polar filtering function.
Figure 3:
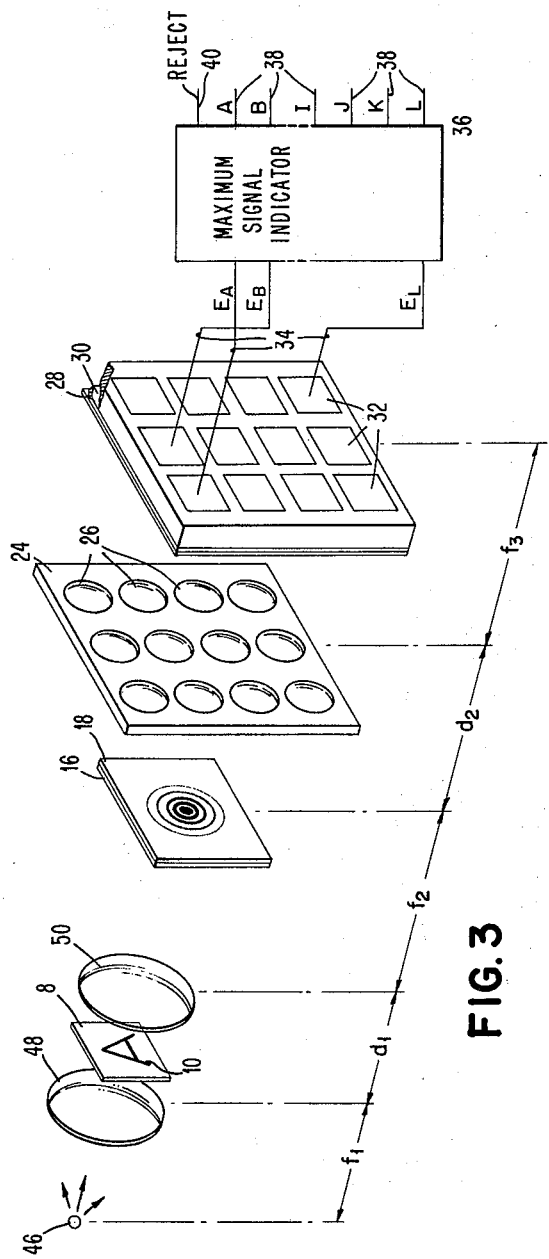
FIGURE 3 is a functional diagram of an optical specimen identification system utilizing Fraunhofer diffraction pattern comparison as modified by filtering techniques.
Figure 6B:
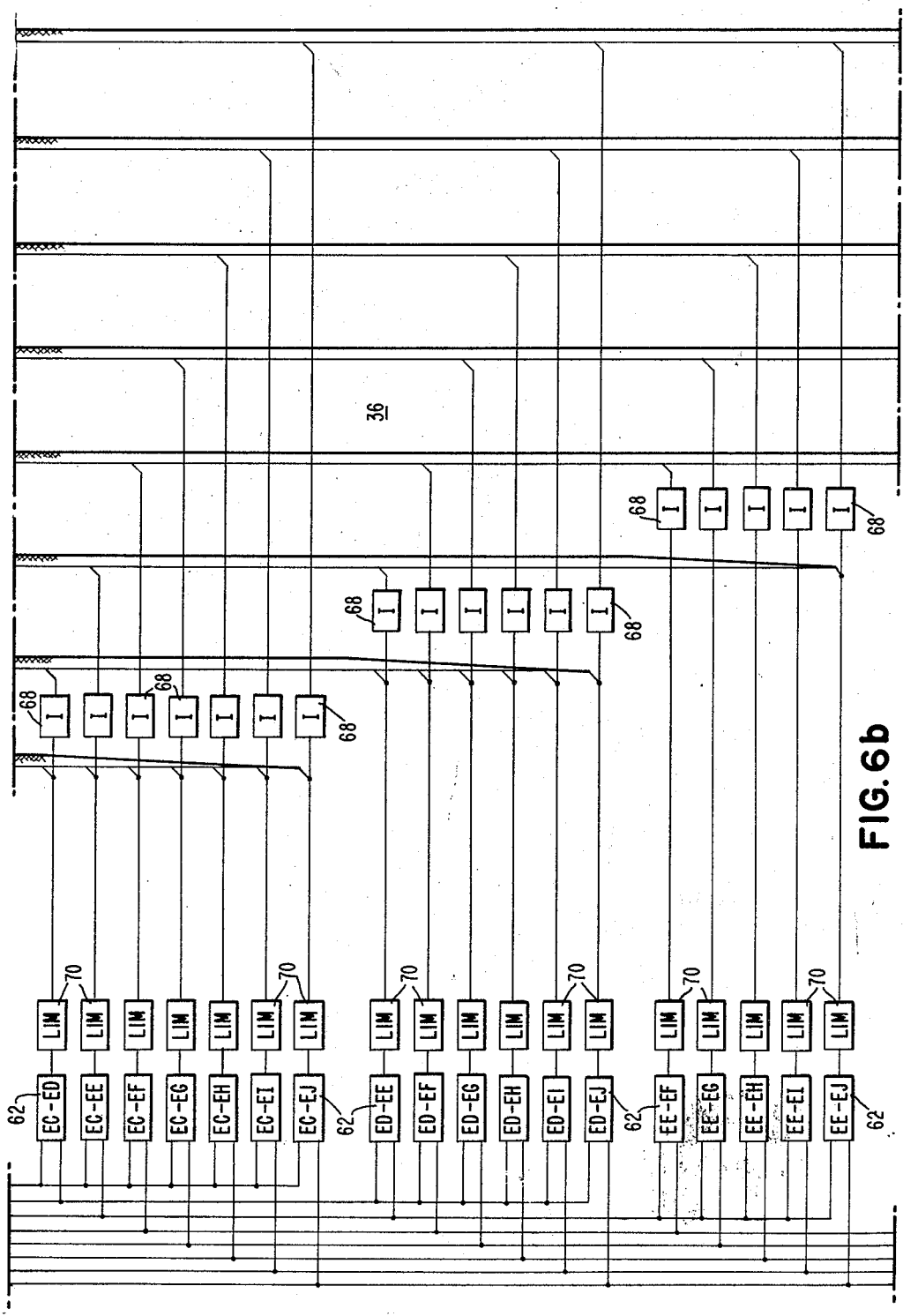
FIGURE 6 is a block diagram showing the relationship of the circuit parts shown in FIGURES 6a, 6b and 6c.

FIGURES 6a, 6b, and 6c show a circuit diagram of part of a maximum signal indicator that may be used in conjunction with the systems shown in FIGURES 1, 2 and 3.

FIGURE 7 is a circuit diagram of a limiter circuit that may be used in conjunction with the circuit of FIGURE 6.

FIGURE 8 is a magnified diagram of three reference patterns that are similar in structure: "A," "B" and "R."

Figure 9:
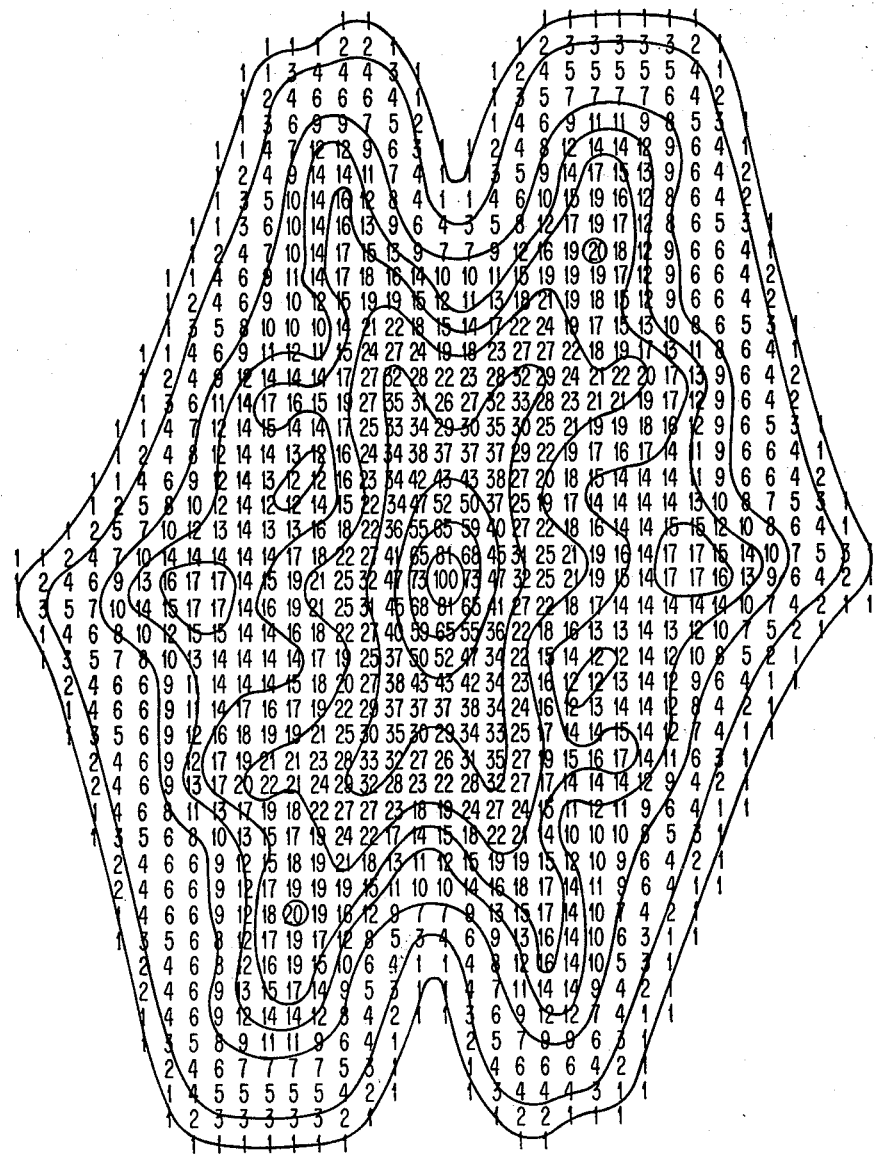

FIGURE 9 is a diagram showing the autocorrelation pattern of the reference pattern "A."

Figure 10:
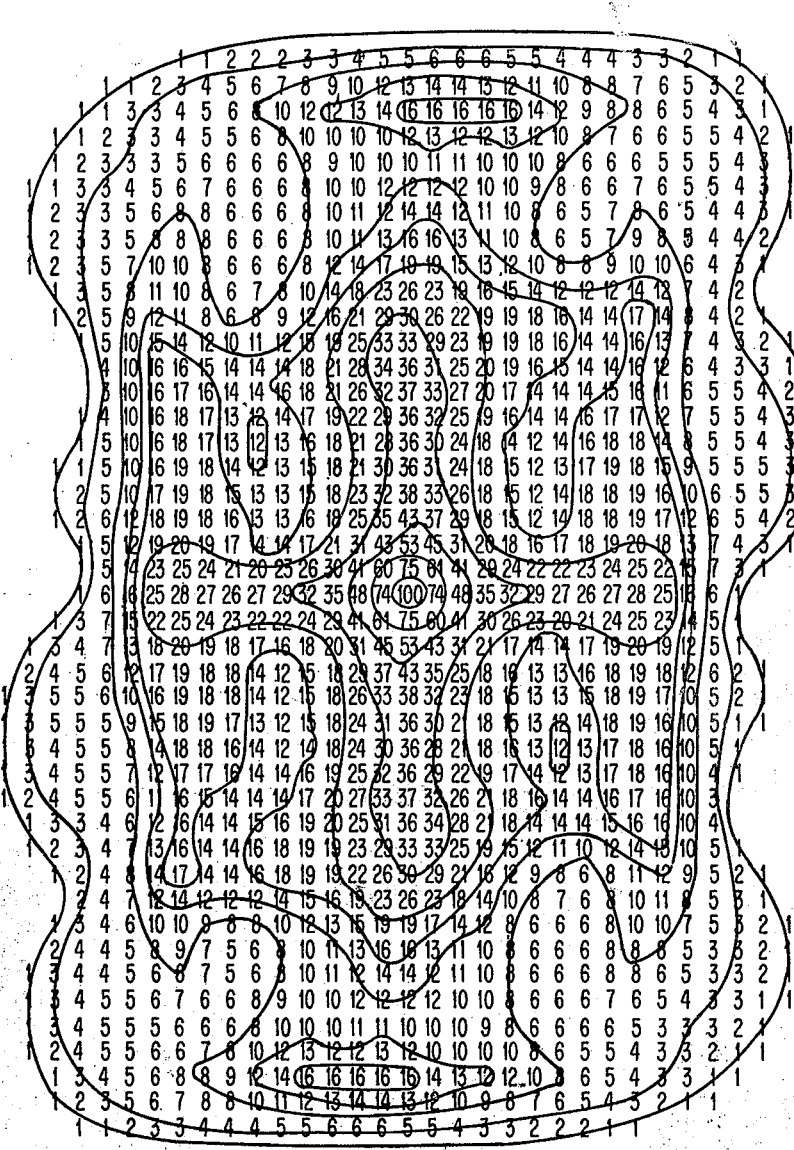

FIGURE 10 is a diagram showing the autocorrelation pattern of the reference pattern "B."

Figure 11:
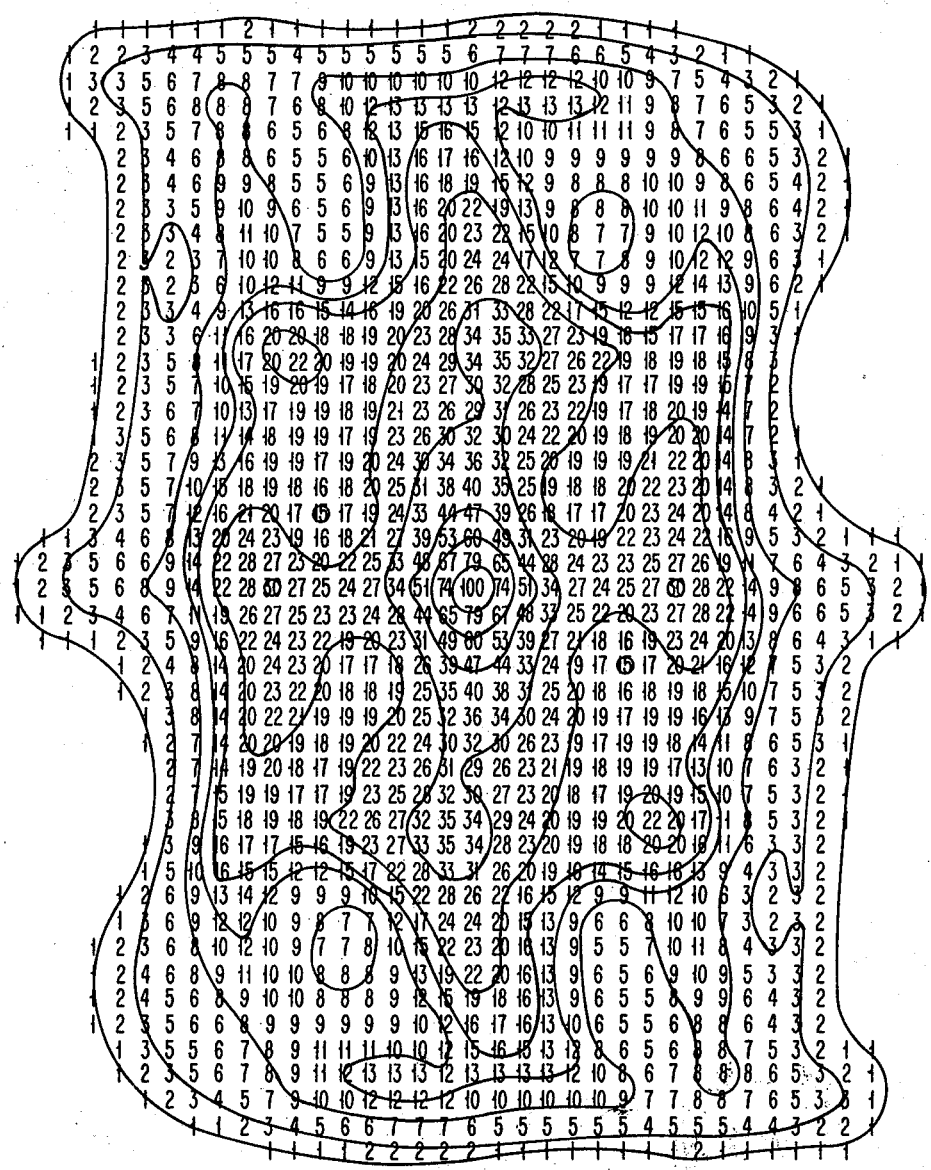

FIGURE 11 is a diagram showing the autocorrelation pattern of the reference pattern "R."

Figure 12:
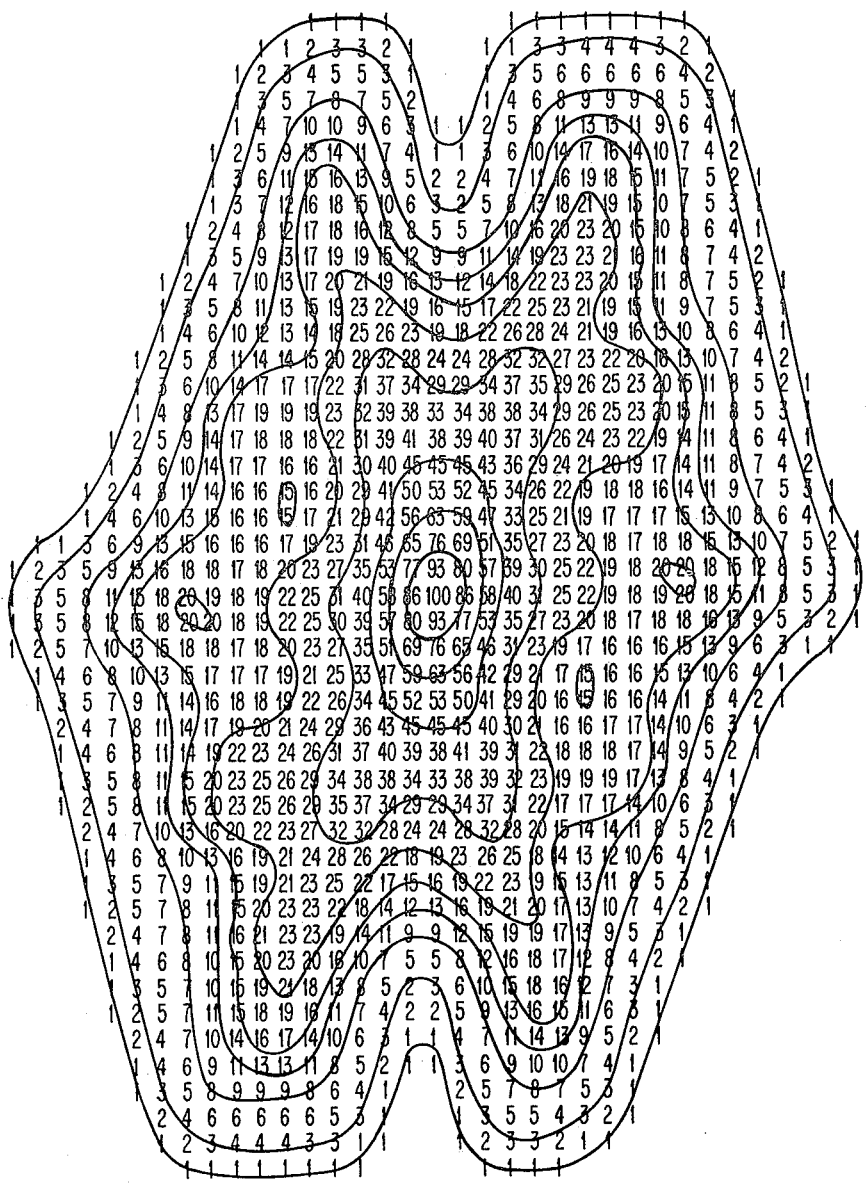

FIGURE 12 is a diagram showing the autocorrelation pattern of the reference pattern "A" after modification by a type of smoothing filter known as the averaging filter.

Figure 13:
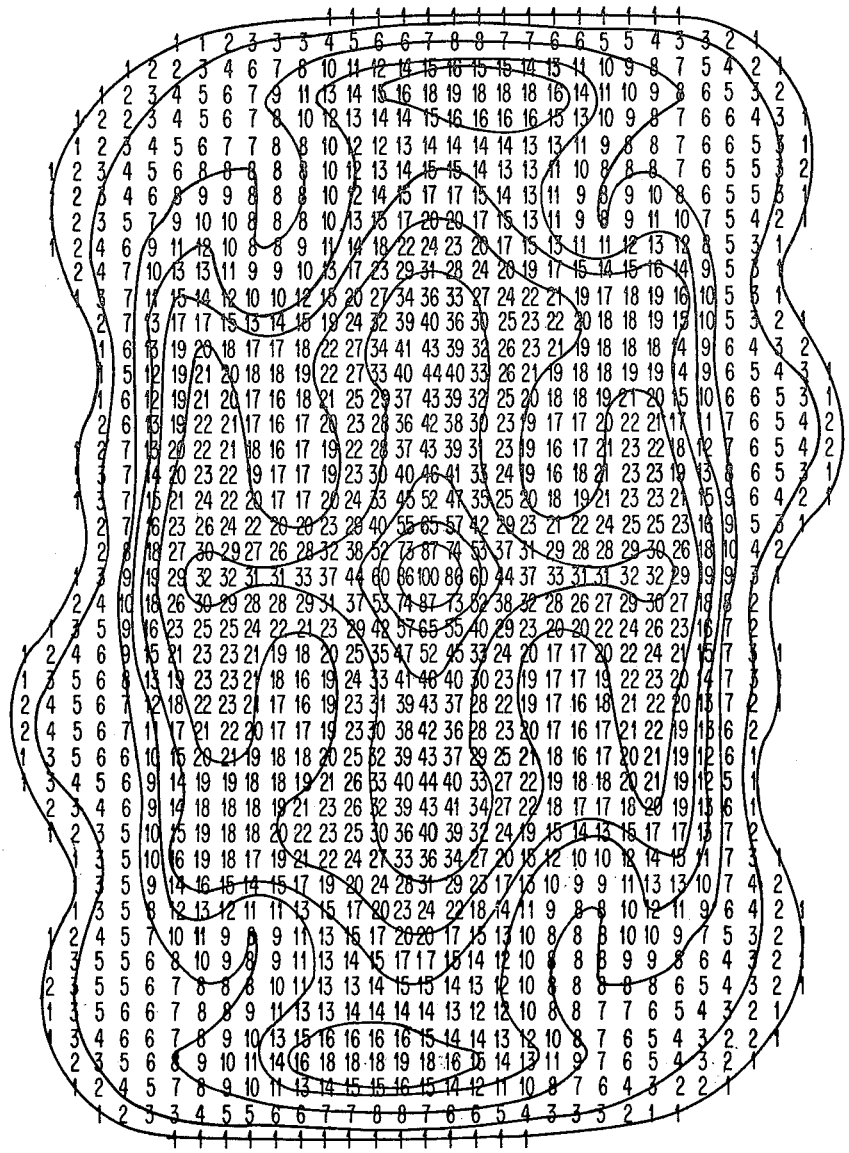

FIGURE 13 is a diagram showing the autocorrelation pattern of the reference pattern "B" after modification by a type of smoothing filter known as the averaging filter.

Figure 14:
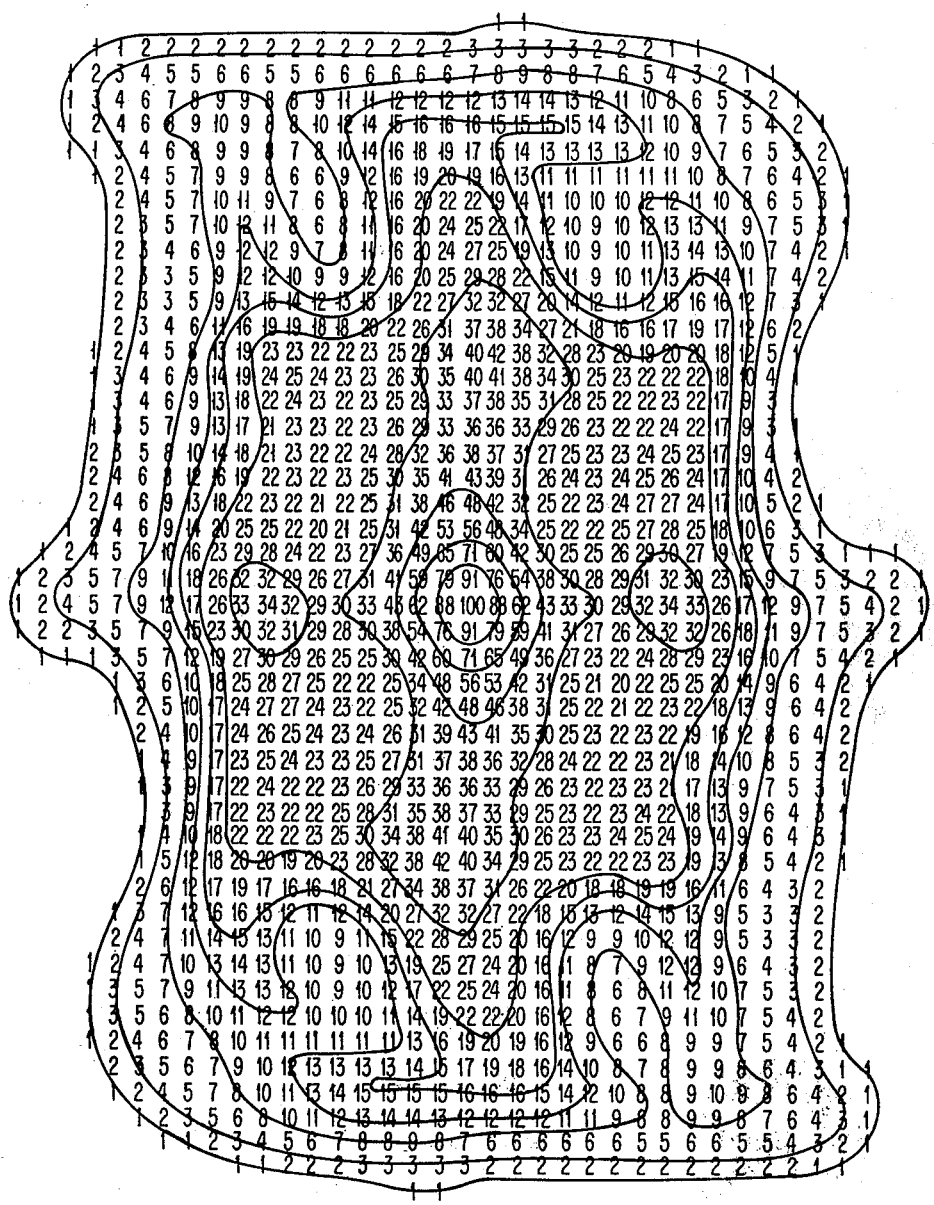

FIGURE 14 is a diagram showing the autocorrelation pattern of the reference pattern "R" after modification by a type of smoothing filter known as the averaging filter.

Figure 15:
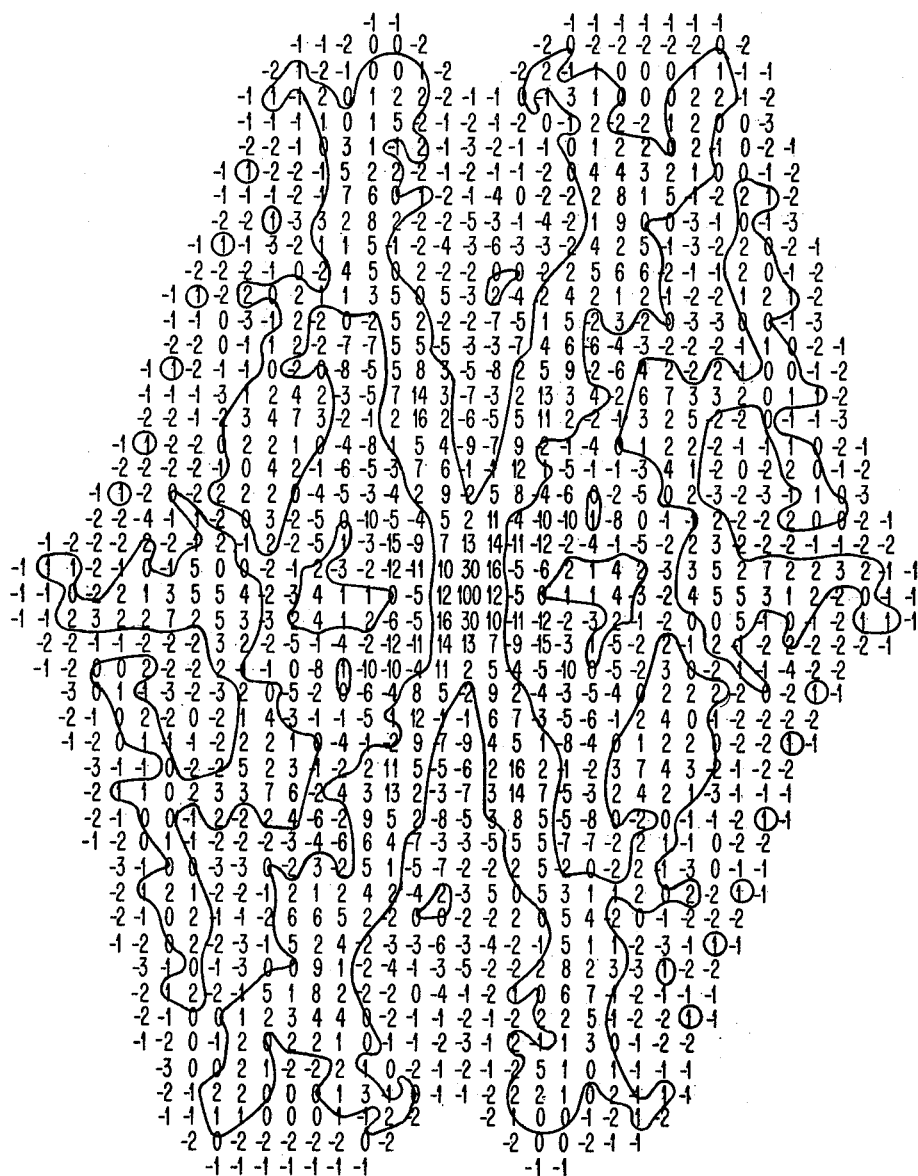

FIGURE 15 is a theoretical diagram showing the autocorrelation pattern of the reference pattern "A" after modification by a type of discriminating filter known as the second-difference filter.

Figure 16:
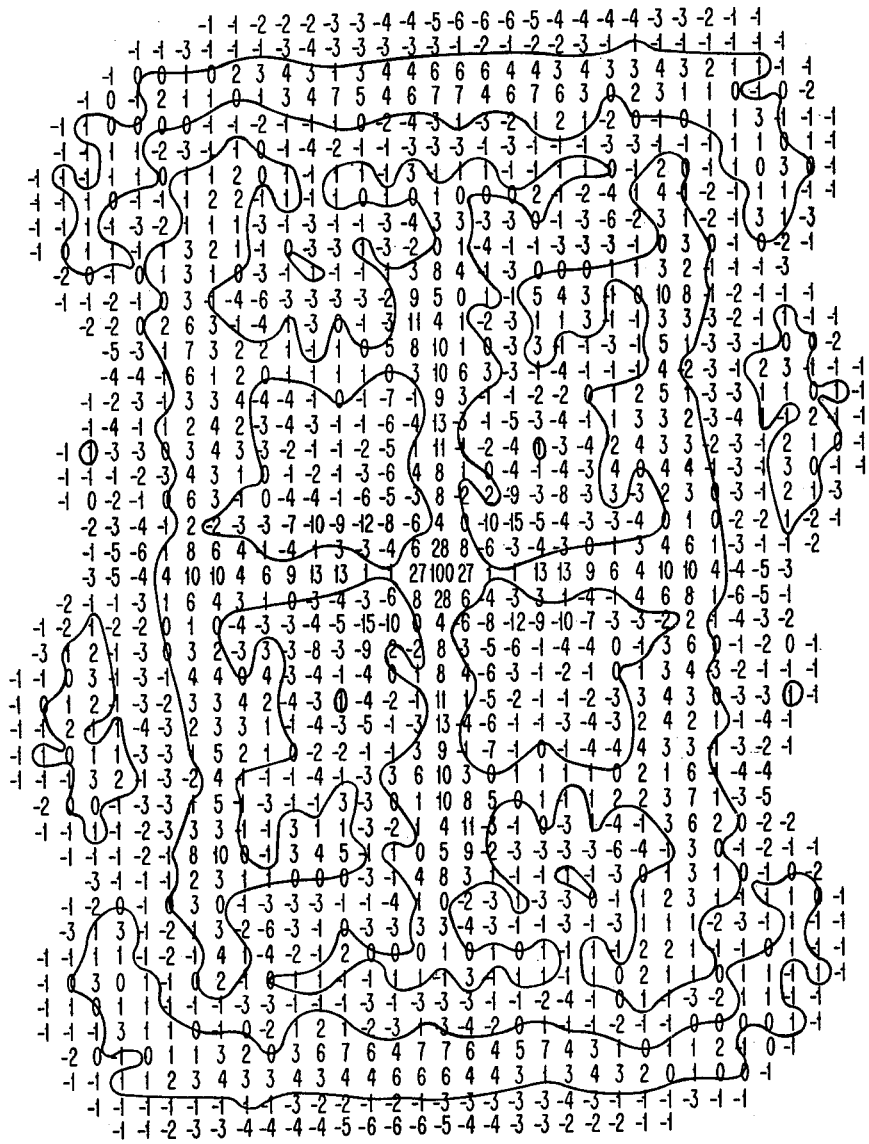

FIGURE 16 is a theortical diagram showing the autocorrelation pattern of the reference pattern "B" after modification by a type of discriminating filter known as the second-difference filter.

Figure 17:
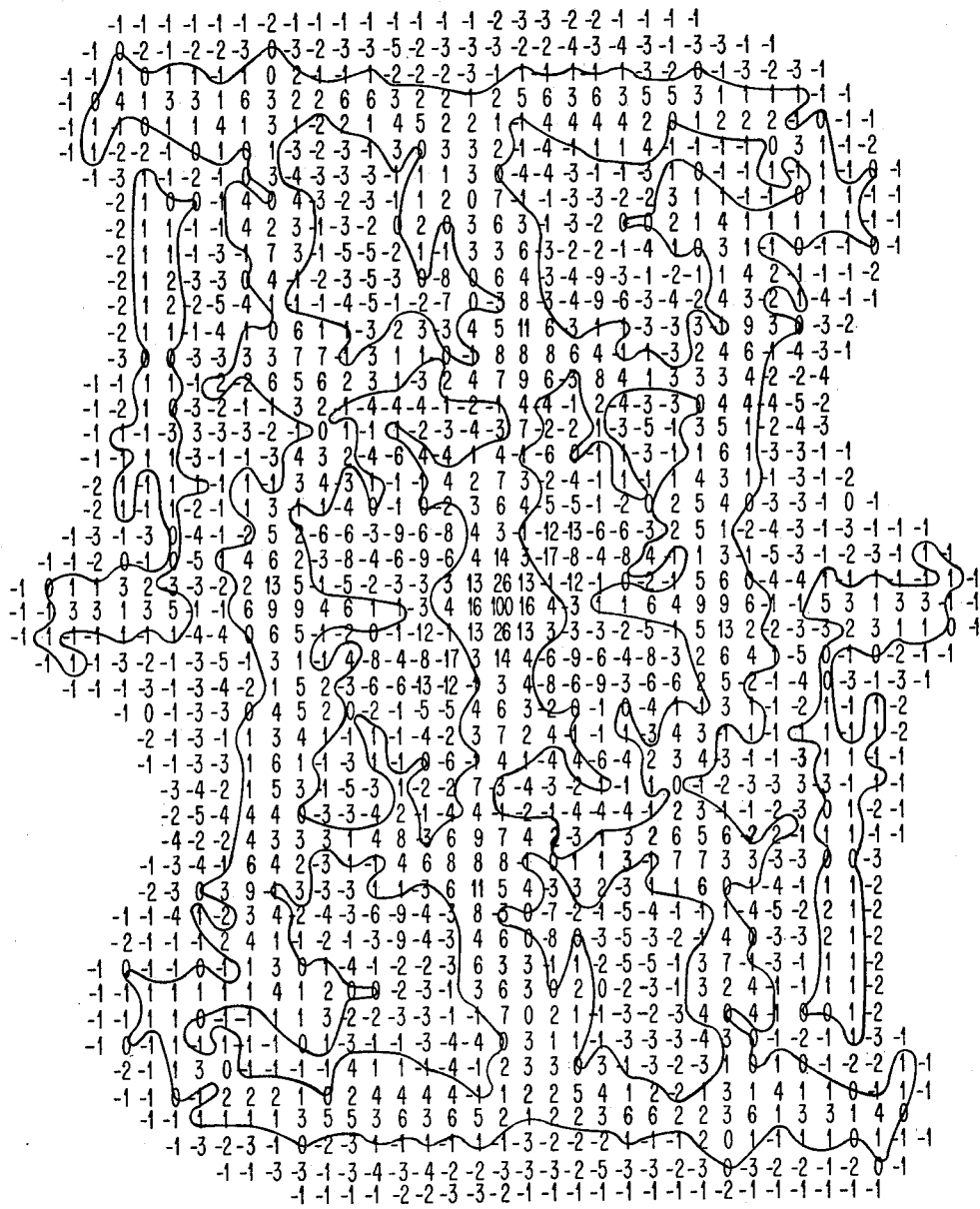

FIGURE 17 is a theoretical diagram showing the autocorrelation pattern of the reference pattern "R" after modification by a type of discriminating filter known as the second-difference filter.

FIGURE 18 is a magnified diagram of three test patterns "A," "B" and "R."

FIGURE 19 is a group of charts showing the correlation of reference and test patterns to reference patterns without the use of a filter and with the use of averaging and second-difference filters.

In order to more clearly illustrate the mathematical inter-relationship of the various embodiments of the invention and the manner in which these embodiments accomplish the ends of the invention, the specification is divided into several topics with the following headings:

(1) Autocorrelation Pattern Comparison — Positive Filter Function Techniques.

(2) Autocorrelation Pattern Comparison — Bipolar Filter Function Techniques.

(3) Fraunhofer Pattern Comparison.

(4) Normalization Procedures.

(5) Maximum Signal Indicator.

(6) Effect of Filtering Techniques on Identification.

(7) Summary.

Each of the first three topics includes a description of three embodiments of the invention. Normalization procedures for the embodiments in Topics 1, 2 and 3 are described in Topic 4. Topic 5 contains a description of a maximum signal indicator that may be used in any of the embodiments described in Topics 1, 2 and 3. The advantages gained by using various filtering techniques are outlined in Topic 6.

*Autocorrelation pattern comparison—Positive filter function techniques*

An optical registration-invariant specimen identification system utilizing filtered autocorrelation pattern comparison is shown in FIG. 1. This system is limited to positive function filtering due to the unavailability of incoherent negative filters. This is true because incoherent light filters operate on light intensity rather than amplitude and light intensity is proportional to the square of the amplitude, and is, thus, positive regardless of the polarity of the amplitude.

A polychromatic (incoherent) source of light 2 is directed toward a half-silvered mirror 4 which reflects the light through a collimating lens 6 toward a transparency 8 containing a specimen designated by the reference numeral 10. The transparency may be relatively transparent with a relatively opaque specimen or relatively opaque with a relatively transparent specimen. A mirror 12 is located behind the transparency 8. Distance $d_1$ is not critical; distance $d_2$ determines the size of the autocorrelation pattern to be developed and is made adjustable to accommodate various-sized specimens. The light reflected by mirror 12 is passed back through the transparency 8 and through the lens 6 toward the half-silvered mirror 4. The light that passes through the mirror forms the autocorrelation pattern 14 on a frosted glass plate 16. The lens 6 is separated from the frosted glass plate by a distance $f_1$ which is equal to the focal length of the lens. This autocorrelation function generator is described in an article by Leslie S. G. Kovásznay and Ali Arman published in the Review of Scientific Instruments, Vol. 28, Number 10, October 1957, pages 793–797.

The autocorrelation pattern 14 developed on the frosted glass plate 16 is registration invariant; that is, it is located at the same place on the plate regardless of the location of the specimen on transparency 8.

In a first of three embodiments described with respect to FIG. 1, the autocorrelation pattern 14 is passed through a filter 18 and generates a modified pattern 20 on a second frosted glass plate 22. The filter is described below. Distances $d_3$ and $d_4$ are not critical; they act in conjunction with the size of the filter pattern to determine the resolution of the pattern 20 according to the formula:

$$\text{desired resolution of pattern } 20 = \left[\frac{d_3+d_4}{d_3}\right]^2 \times \text{area of filter matrix element}$$

In order to simultaneously compare the pattern 20 with a group of reference patterns, a plate 24 containing lenses 26 is used to direct the pattern 20 toward reference pattern masks mounted on a plate 28. There is one lens and one corresponding mask for each reference pattern: for simplicity of drawing, in FIG. 1, only twelve of each are shown, providing identification of the first twelve letters of the English alphabet, "A" through "L." This could be obviously extended to include any number of reference patterns. The masks themselves are not visible on the drawing; a method of obtaining them will be described below. Distance $f_2$ equals the focal length of lenses 26. Distance $d_5$, the position and angles of tilt of lenses 26, distance $f_2$, and the positions of the masks on the plate 28 are dependent, and the device is constructed to cause the pattern 20 to be superimposed on the reference masks. The light passing through the reference masks is directed through normalization masks (to be discussed below) on a plate 30 to a bank of photoelectric cells 32. Each cell provides an output voltage on a lead 34 proportional to the total intensity of light impinging upon it. A maximum signal indicator 36 provides a signal on one of its output leads 38 to identify specimen 10. A reject output lead 40 provides an indication if the specimen does not closely match any of the reference patterns. The maximum signal indicator will be described in detail later.

Serial comparison may be used instead of simultaneous (parallel) comparison by successively comparing the pattern 20 with reference pattern masks. Alternatively, several photo-electric cells may be placed in selected positions behind the frosted glass plate 22. In this embodiment, the intensity of light at these selected positions is compared to reference intensities to identify the specimen.

In the embodiment described above, the autocorrelation pattern $D_S(\vec{V})$ of a specimen S is generated according to the formula:

$$D_S(\vec{V}) = \sum_{\vec{v}} f(\vec{v}) \cdot f(\vec{v}+\vec{V})$$

where the specimen $S=f(\vec{v})$. A filter $A(\vec{V})$ operates on the autocorrelation pattern $D_S(\vec{V})$ to generate a pattern $Q_S(\vec{V^1})$ on the frosted glass plate 22 as follows:

$$Q_S(\vec{V^1}) = \sum_{\vec{V}} D_S(\vec{V}) \cdot A(\vec{V}-\vec{V^1})$$

This pattern $Q_S(\vec{V^1})$ is then compared to the similarly modified autocorrelation pattern $D_R(\vec{V})$ of each reference pattern $R=f(\vec{v})$. The reference mask $Q_R(\vec{V^1})$ is thus:

$$Q_R(\vec{V^1}) = \sum_{\vec{V}} D_R(\vec{V}) \cdot A(\vec{V}-\vec{V^1})$$

and the output voltage $E_R$ from the photoelectric cell 32 (discounting the effect of the normalization mask) is:

$$\sum_{\vec{V^1}} Q_S(\vec{V^1}) \cdot Q_R(\vec{V^1})$$

This equation is then normalized with respect to the reference pattern, to account for the effect of the normalization masks resulting in an output voltage:

$$E_R = \frac{\sum_{\vec{V}^I} Q_S(\vec{V}^I) \cdot Q_R(\vec{V}^I)}{\left[\sum_{\vec{V}^I} Q_R^2(\vec{V}^I)\right]^{1/2}}$$

The normalization masks are described in detail in Topic 4.

In a second embodiment, the effect of the filter 18 may be included in the reference mask and the system may be used without the filter 18 and frosted glass plate 22. (In this case the distance between the frosted glass plate 16 and the bank of lenses 26 is adjusted.) This embodiment is the simplest in operation once the reference masks are obtained because the filter 18 and plate 22, wtih their inherent attenuation of light, are not used.

The reference mask $Y_R(\vec{V}^I)$ in this case represents:

$$Y_R(\vec{V}^I) = \sum_{\vec{V}} D_R(\vec{V}) \cdot B(\vec{V} - \vec{V}^I)$$

where the filter function equals:

$$B(\vec{V}^I) = \sum_{\vec{V}} A(\vec{V}) \cdot A(\vec{V} - \vec{V}^I)$$

$B(\vec{V}^I)$ is obviously the autocorrelation function of $A(\vec{V})$. The normalized photoelectric cell output $E_R$, which represents the result of the normalized comparison of the autocorrelation function of the specimen and the autocorrelation function of a reference as modified by the filter function $B(\vec{V}^I)$, may be expressed as:

$$E_R = \frac{\sum_{\vec{V}^I} D_S(\vec{V}^I) \cdot Y_R(V^I)}{\left[\sum_{\vec{V}^I} Q_R^2(\vec{V}^I)\right]^{1/2}}$$

This method of comparison provides results that are identical to the results obtained when comparing the filtered autocorrelation pattern $Q_S(\vec{V}^I)$ of the specimen with the filtered autocorrelation pattern $Q_R(\vec{V}^I)$. This identity may be expressed as:

$$\frac{\sum_{\vec{V}^I} Q_S(\vec{V}^I) \cdot Q_R(\vec{V}^I)}{\left[\sum_{\vec{V}^I} Q_R^2(\vec{V}^I)\right]^{1/2}} = \frac{\sum_{\vec{V}^I} D_S(\vec{V}^I) \cdot Y_R(\vec{V}^I)}{\left[\sum_{\vec{V}^I} Q_R^2(\vec{V}^I)\right]^{1/2}}$$

This may be proved as follows. The denominators may be deleted, providing:

$$\sum_{\vec{V}^I} Q_S(\vec{V}^I) \cdot Q_R(\vec{V}^I) = \sum_{\vec{V}^I} D_S(\vec{V}^I) \cdot Y_R(\vec{V}^I)$$

The left side of the equation becomes:

$$\sum_{\vec{V}} \sum_{\vec{V}^I} \sum_{\vec{V}^{II}} D_S(\vec{V}) \cdot A(\vec{V} - \vec{V}^I) \cdot D_R(\vec{V}^{II}) \cdot A(\vec{V}^{II} - \vec{V}^I)$$

which may be rewritten as:

$$\sum_{\vec{V}} \sum_{\vec{V}^{II}} D_S(\vec{V}) \cdot D_R(\vec{V}^{II}) \cdot \sum_{\vec{V}^I} A(\vec{V} - \vec{V}^I) \cdot A(\vec{V}^{II} - \vec{V}^I)$$

Substitute:

$$\vec{V}^I = \vec{V} - \vec{V}^{III}$$

$$\sum_{\vec{V}} \sum_{\vec{V}^{II}} D_S(\vec{V}) \cdot D_R(\vec{V}^{II}) \cdot \sum_{\vec{V}^{III}} A(\vec{V}^{III}) \cdot A[\vec{V}^{III} - (\vec{V} - \vec{V}^{II})]$$

Let $$\vec{V}^{III} = \vec{V}^{IV} + \vec{V} - \vec{V}^{II}$$

$$\sum_{\vec{V}} \sum_{\vec{V}^{II}} D_S(\vec{V}) \cdot D_R(\vec{V}^{II}) \cdot \sum_{\vec{V}^{IV}} A[\vec{V}^{IV} - (\vec{V}^{II} - \vec{V})] \cdot A(\vec{V}^{IV})$$

Since the right hand summation $$\left(\sum_{\vec{V}^{IV}}\right)$$

equals $B(\vec{V}^{II} - \vec{V})$, the entire quantity equals:

$$\sum_{\vec{V}} D_S(\vec{V}) \cdot Y_R(\vec{V})$$

which equals the numerator of the right side of the identity in question.

In a third embodiment, the reference masks may be unmodified autocorrelation patterns $D_R(\vec{V}^I)$ of the reference patterns R and the autocorrelation function of the specimen is modified by a filter function: $B(\vec{V}^I)$. This embodiment obviously provides results identical to those provided by either of the previously mentioned embodiments.

The filters shown in FIGURES 1a and 1b represent the $A(\vec{V})$ and $B(\vec{V}^I)$ filters, respectively, for a type of smoothing referred to as averaging. The $A(\vec{V})$ filter may be represented by the matrix:

```
0 1 0
1 1 1
0 1 0
``` and the $B(\vec{V}^I)$ filter, by the matrix:

```
0 0 1 0 0
0 2 2 2 0
1 2 5 2 1
0 2 2 2 0
0 0 1 0 0
``` where the numbers in the matrices are indicative of the transparency of the filter elements.

The reference masks may be generated by photographing the frosted glass plate 22 using the $A(\vec{V})$ filter with reference input patterns when comparison between filtered specimens and filtered reference patterns is desired (first embodiment). When the filtering operation is to be included in the reference masks (second embodiment), the masks may be generated by photographing the frosted glass plate 22 using the $B(\vec{V}^I)$ filter. In this case, once the reference masks are generated, the filter 18 and frosted glass plate 22 are not used. When comparison between filtered specimen autocorrelation patterns and unfiltered reference patterns is used (third embodiment), the reference masks may be obtained by photographing the frosted glass plate 16. Any of the reference masks may also be generated by an artist from computed data.

2. *Autocorrelation pattern comparison—Bipolar filter function techniques*

Negative filtering techniques, as such, are available, limiting the embodiment shown in FIG. 1 to positive filter functions. Several techniques are available for incorporating bipolar filter functions in an optical specimen identification system. Each technique requires the filter function to be divided into two positive functions, one containing the positive elements and one containing the negative elements of the bipolar function. Thus, a bipolar function $\vec{A(V)}$ is converted into two positive functions $A^+(\vec{V})$ and $A^-(\vec{V})$ such that $A(\vec{V})=A^+(\vec{V})-A^-(\vec{V})$.

Three embodiments of bipolar filter function techniques as applied to specimen identification systems utilizing autocorrelation pattern comparison will be described. In general, they correspond to the three embodiments described with respect to the system using positive filter functions shown in FIG. 1.

In a first embodiment, comparison is made between a filtered specimen and filtered references. Four functions are used in this embodiment:

$$Q_S^+(\vec{V^i}) = \sum_{\vec{V}} D_S(\vec{V}) \cdot A^+(\vec{V}-\vec{V^i})$$

$$Q_S^-(\vec{V^i}) = \sum_{\vec{V}} D_S(\vec{V}) \cdot A^-(\vec{V}-\vec{V^i})$$

$$Q_R^+(\vec{V^i}) = \sum_{\vec{V}} D_R(\vec{V}) \cdot A^+(\vec{V}-\vec{V^i})$$

$$Q_R^-(\vec{V^i}) = \sum_{\vec{V}} D_R(\vec{V}) \cdot A^-(\vec{V}-\vec{V^i})$$

Four comparisons are required to generate reference voltages:

$$E_R^{(++)} = \frac{\sum_{\vec{V^i}} Q_S^+(\vec{V^i}) \cdot Q_R^+(\vec{V^i})}{\left[\sum_{\vec{V^i}} Q_R^2(\vec{V^i})\right]^{1/2}}$$

$$E_R^{(+-)} = \frac{\sum_{\vec{V^i}} Q_S^+(\vec{V^i}) \cdot Q_R^-(\vec{V^i})}{\left[\sum_{\vec{V^i}} Q_R^2(\vec{V^i})\right]^{1/2}}$$

$$E_R^{(-+)} = \frac{\sum_{\vec{V^i}} Q_S^-(\vec{V^i}) \cdot Q_R^+(\vec{V^i})}{\left[\sum_{\vec{V^i}} Q_R^2(\vec{V^i})\right]^{1/2}}$$

$$E_R^{(--)} = \frac{\sum_{\vec{V^i}} Q_S^-(\vec{V^i}) \cdot Q_R^-(\vec{V^i})}{\left[\sum_{\vec{V^i}} Q_R^2(\vec{V^i})\right]^{1/2}}$$

These voltages are combined as follows to provide an output voltage $E_R$:

$$E_R = [E_R(++) - E_R(+-)] - [E_R(-+) - E_R(--)]$$

This embodiment produces identical results to those that would be produced if a single, optical, bipolar filter $A(\vec{V})$ were available. Comparison using this hypothetical bipolar filter would produce an output voltage:

$$E_R = \frac{\sum_{\vec{V^i}} Q_S(\vec{V^i}) \cdot Q_R(\vec{V^i})}{\left[\sum_{\vec{V^i}} Q_R^2(\vec{V^i})\right]^{1/2}}$$

Replacing $A(\vec{V}-\vec{V^i})$ by $A^+(\vec{V}-\vec{V^i})-A^-(\vec{V}-\vec{V^i})$ in the equations:

$$Q_S(\vec{V^i}) = \sum_{\vec{V}} D_S(\vec{V}) \cdot A(\vec{V}-\vec{V^i})$$

$$Q_R(\vec{V^i}) = \sum_{\vec{V}} D_R(\vec{V}) \cdot A(\vec{V}-\vec{V^i})$$

results in:

$$Q_S(\vec{V^i}) = \sum_{\vec{V}} \left[D_S(\vec{V})\right] \cdot \left[A^+(\vec{V}-\vec{V^i}) - A^-(\vec{V}-\vec{V^i})\right]$$

$$Q_R(\vec{V^i}) = \sum_{\vec{V}} \left[D_R(\vec{V})\right] \cdot \left[A^+(\vec{V}-\vec{V^i}) - A^-(\vec{V}-\vec{V^i})\right]$$

Each of these equations may be rewritten as follows:

$$Q_S(\vec{V^i}) = \sum_{\vec{V}} D_S(\vec{V}) \cdot A^+(\vec{V}-\vec{V^i}) - \sum_{\vec{V}} D_S(\vec{V}) \cdot A^-(\vec{V}-\vec{V^i})$$

$$Q_R(\vec{V^i}) = \sum_{\vec{V}} D_R(\vec{V}) \cdot A^+(\vec{V}-\vec{V^i}) - \sum_{\vec{V}} D_R(\vec{V}) \cdot A^-(\vec{V}-\vec{V^i})$$

Thus:

$$Q_S(\vec{V^i}) = Q_S^+(\vec{V^i}) - Q_S^-(\vec{V^i})$$

$$Q_R(\vec{V^i}) = Q_R^+(\vec{V^i}) - Q_R^-(\vec{V^i})$$

Replacing these quantities in the above equation for $E_R$ provides:

$$E_R = \frac{\sum_{\vec{V^i}} \left[Q_S^+(\vec{V^i}) - Q_S^-(\vec{V^i})\right] \cdot \left[Q_R^+(\vec{V^i}) - Q_R^-(\vec{V^i})\right]}{\left[\sum_{\vec{V^i}} Q_R^2(\vec{V^i})\right]}$$

which is exactly the result obtained in this embodiment after performing the linear combination:

$$E_R = [E(++) - E(+-)] - [E(-+) - E(--)]$$

The four-channel system that is required for this first embodiment is not shown because it is an obvious extension of the two-channel system shown in FIG. 2 for the more practical second and third embodiments described below. The first embodiment is a straight-forward, bipolar filtering technique and was described primarily as an introduction to the more practical embodiments.

The bipolar filter function may be modified and entirely incorporated within the reference patterns or within the specimen filter. These techniques form the basis for the second and third embodiments, respectively. In the second embodiment, which is the simplest in structure, no specimen filter is utilized and the comparison is made with masks reflecting a modified filter function $B(\vec{V^i})$ of the reference patterns. This bipolar function is converted into two positive functions $B^+(\vec{V^i})$ and $B^-(\vec{V^i})$ according to the formula:

$$B(\vec{V^i}) = B^+(\vec{V^i}) - B^-(\vec{V^i})$$

In this embodiment, two reference masks: $Y_R^+(\vec{V^i})$ and $Y_R^-(\vec{V^i})$ are required, where:

$$Y_R^+(\vec{V^i}) = \sum_{\vec{V}} D_R(\vec{V}) \cdot B^+(\vec{V}-\vec{V^i})$$

$$Y_R^-(\vec{V^i}) = \sum_{\vec{V}} D_R(\vec{V}) \cdot B^-(\vec{V}-\vec{V^i})$$

FIG. 2 shows a specimen identification system similar to that shown in FIG. 1, but containing two optical channels. In the second embodiment, the specimen filter 18 and ground glass plate 22 are not used—they are included in the diagram to illustrate the third embodiment to be described subsequently. The upper channel is the negative channel; the lower is the positive channel. The operation of this system is similar to the operation of the system shown in FIG. 1 in many respects. The systems differ in that two groups of lenses 26 on a plate 24 direct the autocorrelation pattern of the specimen toward two groups of reference masks representing $Y_R^+(\vec{V^1})$ and $Y_R^-(\vec{V^1})$ on a plate 28. Normalization masks are located on a plate 30 and photoelectric cells 32 are placed behind each mask. The upper photoelectric cells develop voltages $E_A(-)$, $E_B(-)$, etc.; the lower cells develop voltages $E_A(+)$, $E_B(+)$, etc. A group of difference amplifiers 42 performs substractions: $E_A(+) - E_A(-)$; $E_B(+) - E_B(-)$; etc. to develop $E_A$, $E_B$, etc. The maximum signal indicator 36 (described in detail in Topic 5, below) provides an indication of the largest of these voltages.

Each output $E_R$ thus represents $[E_R(+) - E_R(-)]$ for a particular reference R where:

$$E_R(+) = \frac{\sum_{\vec{V^1}} D_S(\vec{V^1}) \cdot Y_R^+(\vec{V^1})}{\left[\sum_{\vec{V^1}} Q_R^2(\vec{V^1})\right]^{1/2}}$$

$$E_R(-) = \frac{\sum_{\vec{V^1}} D_S(\vec{V^1}) \cdot Y_R^-(\vec{V^1})}{\left[\sum_{\vec{V^1}} Q_R^2(\vec{V^1})\right]^{1/2}}$$

Therefore:

$$E_R = \frac{\sum_{\vec{V^1}} D_S(\vec{V^1}) \cdot Y_R^+(\vec{V^1}) - \sum_{\vec{V^1}} D_S(\vec{V^1}) \cdot Y_R^-(\vec{V^1})}{\left[\sum_{\vec{V^1}} Q_R^2(\vec{V^1})\right]^{1/2}}$$

which may be rewritten as:

$$E_R = \frac{\left[\sum_{\vec{V^1}} D_S(\vec{V^1})\right] \cdot \left[Y_R^+(\vec{V^1}) - Y_R^-(\vec{V^1})\right]}{\left[\sum_{\vec{V^1}} Q_R^2(\vec{V^1})\right]^{1/2}}$$

Obviously, $$Y_R(\vec{V^1}) = Y_R^+(\vec{V^1}) - Y_R^-(\vec{V^1})$$

Therefore, $$E_R = \frac{\sum_{\vec{V^1}} D_S(\vec{V^1}) \cdot Y_R(\vec{V^1})}{\left[\sum_{\vec{V^1}} Q_R^2(\vec{V^1})\right]^{1/2}}$$

Since it has been previously shown that:

$$\sum_{\vec{V^1}} Q_S(\vec{V^1}) \cdot Q_R(\vec{V^1}) = \sum_{\vec{V^1}} D_S(\vec{V^1}) \cdot Y_R(\vec{V^1})$$

this embodiment provides the same result that would be obtained if a bipolar filtering technique were available and the reference pattern mask incorporated in the filter function.

The third embodiment utilizes the system shown in FIG. 2, including the filter 18 and frosted glass plate 22. In this embodiment, the reference masks on plate 28 correspond to unfiltered autocorrelation patterns of the reference patterns. Identical reference masks are used in both the upper (negative) and lower (positive) channels. The filter 18 contains two sections: the upper contains the filter function $B^-(\vec{V^1})$; the lower contains the function $B^+(\vec{V^1})$. In this embodiment, the patterns developed on plate 22 correspond to:

$$Y_S^-(\vec{V^1}) = \sum_{\vec{V}} D_S(\vec{V}) \cdot B^-(\vec{V} - \vec{V^1})$$

$$Y_S^+(\vec{V^1}) = \sum_{\vec{V}} D_S(\vec{V}) \cdot B^+(\vec{V} - \vec{V^1})$$

and the output voltages $E_R(+)$ and $E_R(-)$ may be represented as:

$$E_R(+) = \sum_{\vec{V^1}} Y_S^+(\vec{V^1}) \cdot D_R(\vec{V^1})$$

$$E_R(-) = \sum_{\vec{V^1}} Y_S^-(\vec{V^1}) \cdot D_R(\vec{V^1})$$

This embodiment obviously provides the same results as any of the embodiments previously described.

One example of a bipolar filter function is the type of discriminating function known as the second-difference function which may be represented by the matrix:

$$A(\vec{V}) = \begin{matrix} 0 & -1 & 0 \\ -1 & 4 & -1 \\ 0 & -1 & 0 \end{matrix}$$

This matrix may be used as the basis for the four-channel, bipolar system (first embodiment) where comparison is made between a filtered autocorrelation pattern of the specimen and filtered autocorrelation patterns of reference patterns. In this case, the following filters are used:

$$A^+(\vec{V}) = \begin{matrix} 0 & 0 & 0 \\ 0 & 4 & 0 \\ 0 & 0 & 0 \end{matrix}$$

$$A^-(\vec{V}) = \begin{matrix} 0 & 1 & 0 \\ 1 & 0 & 1 \\ 0 & 1 & 0 \end{matrix}$$

If the filtering action is to be entirely incorporated in the reference pattern (second embodiment) or in the specimen filters (third embodiment), the filter function $B(\vec{V^1})$ is used, where:

$$B(\vec{V^1}) = \begin{matrix} 0 & 0 & 1 & 0 & 0 \\ 0 & 2 & -8 & -2 & 0 \\ 1 & -8 & 20 & -8 & 1 \\ 0 & 2 & -8 & 2 & 0 \\ 0 & 0 & 1 & 0 & 0 \end{matrix}$$

$$B^+(\vec{V^1}) = \begin{matrix} 0 & 0 & 1 & 0 & 0 \\ 0 & 2 & 0 & 2 & 0 \\ 1 & 0 & 20 & 0 & 1 \\ 0 & 2 & 0 & 2 & 0 \\ 0 & 0 & 1 & 0 & 0 \end{matrix}$$

$$B^-(\vec{V^1}) = \begin{matrix} 0 & 0 & 0 & 0 & 0 \\ 0 & 0 & 8 & 0 & 0 \\ 0 & 8 & 0 & 8 & 0 \\ 0 & 0 & 8 & 0 & 0 \\ 0 & 0 & 0 & 0 & 0 \end{matrix}$$

The specimen filter 18 in FIG. 2 (shown in detail in FIG. 2a) is based on these matrices, where the numbers in the matrices correspond to the relative transparency of the elements of the filter at corresponding positions. The composite filter function $B(\vec{V^1})$, which contains positive and negative elements, is the basis from which filter functions $B^+(\vec{V_I})$ and $B^-(\vec{V_I})$ are generated, where $B^+(\vec{V_I})$ represents a positive filter and includes the positive values of the composite filter function $B(\vec{V^I})$, and where $B^-(\vec{V^I})$ represents another positive filter and includes the negative values of the composite filter function with their signs changed to render the values positive.

The systems shown in FIGS. 1 and 2 provide specimen identification dependent upon autocorrelation pattern comparison as enhanced by filtering techniques.

*(3) Fraunhofer pattern comparison*

Filtering techniques to enhance identification may also be used in conjunction with a specimen identification system utilizing Fraunhofer diffraction pattern comparison as shown in FIG. 3. All real filtering techniques in the Fraunhofer plane may be accomplished by the use of a positive filter function, so a two-channel embodiment is not required.

In FIG. 3, a monochromatic point source of light 46, located a distance $f_1$ from a lens 48 equal to the focal length of the lens, applies coherent collimated light to the input specimen transparency 8. The transparency 8 contains an input specimen designated by the reference numeral 10. The input specimen can be relatively transparent on a relatively opaque background or relatively opaque on a relatively transparent background as shown. A second lens 50 directs the light energy passed by the input specimen transparency 8 to a frosted glass plate 16. Distance $d_1$ between the lenses 48 and 50 is not critical as the light passing between them is collimated. On the other hand, the frosted glass plate 16 is located at a distance $f_2$ from lens 50 which distance is equal to the focal length of this lens. A Fraunhofer diffraction pattern for the input specimen is developed on the frosted glass plate 16.

A more detailed discussion of the generation of Fraunhofer diffraction patterns may be found in a text authored by Francis Webster Sears, Optics, 1949, Library of Congress classification QC 355.S45, Chapter 9. Another text, authored by George Joos and entitled Theoretical Physics provides a mathematical discussion of Fraunhofer diffraction patterns at pages 379–390 showing them to be Fourier transforms of the input specimen. This text is available in the Library of Congress, classification QC 20.J62, 1958.

A filter 18 is placed directly behind the frosted glass plate 16. The operation of this filter on the diffraction patterns is described later.

In order to simultaneously compare the diffraction pattern of the specimen with several reference diffraction patterns, a plate 24 containing several lenses 26 is used to direct the pattern toward several reference diffraction pattern masks mounted on a plate 28. There is one lens and one reference mask for each reference character. The masks themselves are not visible in the figure but a method of generating them is described below. Distance $f_3$ equals the focal length of lenses 26. The light passing through the reference masks is directed through normalization masks on a plate 30 (to be discussed below) to a bank of photoelectric cells 32. Each cell provides an output voltage on lead 34 proportional to the amount of light impinging upon it. A maximum signal indicator circuit 36 (described in detail in Topic 5) provides a signal on one of its output leads 38 to identify the specimen. A reject output lead 40 is also provided to indicate that the specimen does not closely match any one of the reference patterns.

Three embodiments of filtered Fraunhofer pattern, specimen identification paralleling the three embodiments described with respect to autocorrelation pattern specimen identification, are available. The first embodiment utilizes comparison between a filtered Fraunhofer pattern of the specimen and filtered Fraunhofer pattern of reference patterns. The second and third embodiments incorporate the entire filtering operation on the specimen or incorporate the entire filtering operation in the reference pattern masks.

Since all filtering techniques in the Fraunhofer pattern specimen identification system operate in the same plane, the filter function $|\overline{A}(\vec{W})|^2$ for the second and third embodiments is merely the square of the filter function $|\overline{A}(\vec{W})|$ for the first embodiment. This is in contrast to the autocorrelation pattern comparison systems where one filter function $B(\vec{V^I})$ is the autocorrelation function of the other function $A(\vec{V})$.

The single filter function $|\overline{A}(\vec{W})|^2$ systems (second and third embodiments) will be described below—the relatively impractical first embodiment is based on the same theory, replacing $|\overline{A}(\vec{W})|^2$ with $|\overline{A}(\vec{W})| \cdot |\overline{A}(\vec{W})|$ throughout.

In the second embodiment (FIG. 3), the Fraunhofer diffraction pattern $\overline{D}_S(\vec{W})$ of a specimen $S = f(\vec{V})$ is modified by a filter function $|\overline{A}(\vec{W})|^2$ to generate a pattern $\overline{Q}_S(\vec{W})$ according to the formula:

$$\overline{Q}_S(\vec{W}) = \overline{D}_S(\vec{W}) \cdot |\overline{A}(\vec{W})|^2$$

This pattern is then compared to normalized Fraunhofer diffraction patterns $D_R(\vec{W})$ of reference patterns. The comparison may be represented as:

$$E_R = \frac{\sum_{\vec{W}} \left[ |\overline{A}(\vec{W})|^2 \cdot \overline{D}_S(\vec{W}) \right] \cdot \overline{D}_R(\vec{W})}{\left[ \sum_{\vec{W}} \overline{D}_R^2(\vec{W}) \cdot |\overline{A}(\vec{W})|^2 \right]^{1/2}}$$

This comparison, using Fraunhofer diffraction patterns which are Fourier transforms of the input specimen, provides the same result that is developed using autocorrelation pattern comparison as filtered by the function $A(\vec{V})$. This comparison was shown to provide an output:

$$E_R = \frac{\left[ \sum_{\vec{V^I}} Q_S(\vec{V^I}) \right] \cdot \left[ Q_R(\vec{V^I}) \right]}{\left[ \sum_{\vec{V^I}} Q_R^2(\vec{V^I}) \right]^{1/2}}$$

Using Parseval's relation for complex transforms:

$$E_R = \frac{\sum_{\vec{W}} \overline{Q}_S(\vec{W}) \cdot \overline{Q}_R(\vec{W})^*}{\left[ \sum_{\vec{W}} \overline{Q}_R(\vec{W}) \cdot \overline{Q}_R(\vec{W})^* \right]^{1/2}}$$

By the convolution theorem:

$$\overline{Q}_S(\vec{W}) = \overline{D}_S(\vec{W}) \cdot |\overline{A}(\vec{W})|^2$$

and, therefore, since $\overline{D}_R(\vec{W})$ is real:

$$E_R = \frac{\sum_{\vec{W}} \left[ \overline{D}_S(\vec{W}) \cdot |\overline{A}(\vec{W})|^2 \right] \cdot \overline{D}_R(\vec{W})}{\sum_{\vec{W}} \left[ \overline{D}_R(\vec{W})^2 \cdot |\overline{A}(\vec{W})|^2 \right]^{1/2}}$$

Thus, comparison of the Fraunhofer pattern $\overline{D}_S(\vec{W})$ of a specimen S filtered by the function $|\overline{A}(\vec{W})|^2$ with unfiltered Fraunhofer patterns $\overline{D}_R(\vec{W})$ of reference patterns R is identical in result to comparison of the autocorrelation pattern $D_S(\vec{V})$ of a specimen S filtered by the function $A(\vec{V})$ with filtered autocorrelation patterns $D_R(\vec{V})$ of reference patterns R, where the reference pattern reflects the filter function $A(\vec{V})$.

In a third embodiment, specimen identification using Fraunhofer diffraction patterns is accomplished without filtering the specimen and the filter function $|A(\vec{W})|^2$ is incorporated in the reference mask. This comparison is defined as:

$$E_R = \frac{\sum_{\vec{W}}\left[|\overline{A}(\vec{W})|^2 \cdot \overline{D}_R(\vec{W})\right] \cdot \overline{D}_S(\vec{W})}{\left[\sum_{\vec{W}} \overline{D}_R^2(\vec{W}) \cdot |\overline{A}(\vec{W})|^2\right]^{1/2}}$$

In this case, filter 18 is not used, after the reference pattern masks have been generated, making this embodiment the simplest and most practical.

Unfiltered Fraunhofer pattern reference masks may be obtained by removing filter 18 and photographing frosted glass plate 16, while using reference patterns for input specimens.

Filtered Fraunhofer pattern reference masks may be obtained by placing a frosted glass plate after the filter 18 and photographing the patterns developed in this plate while using reference patterns for input specimens.

Figure 4:
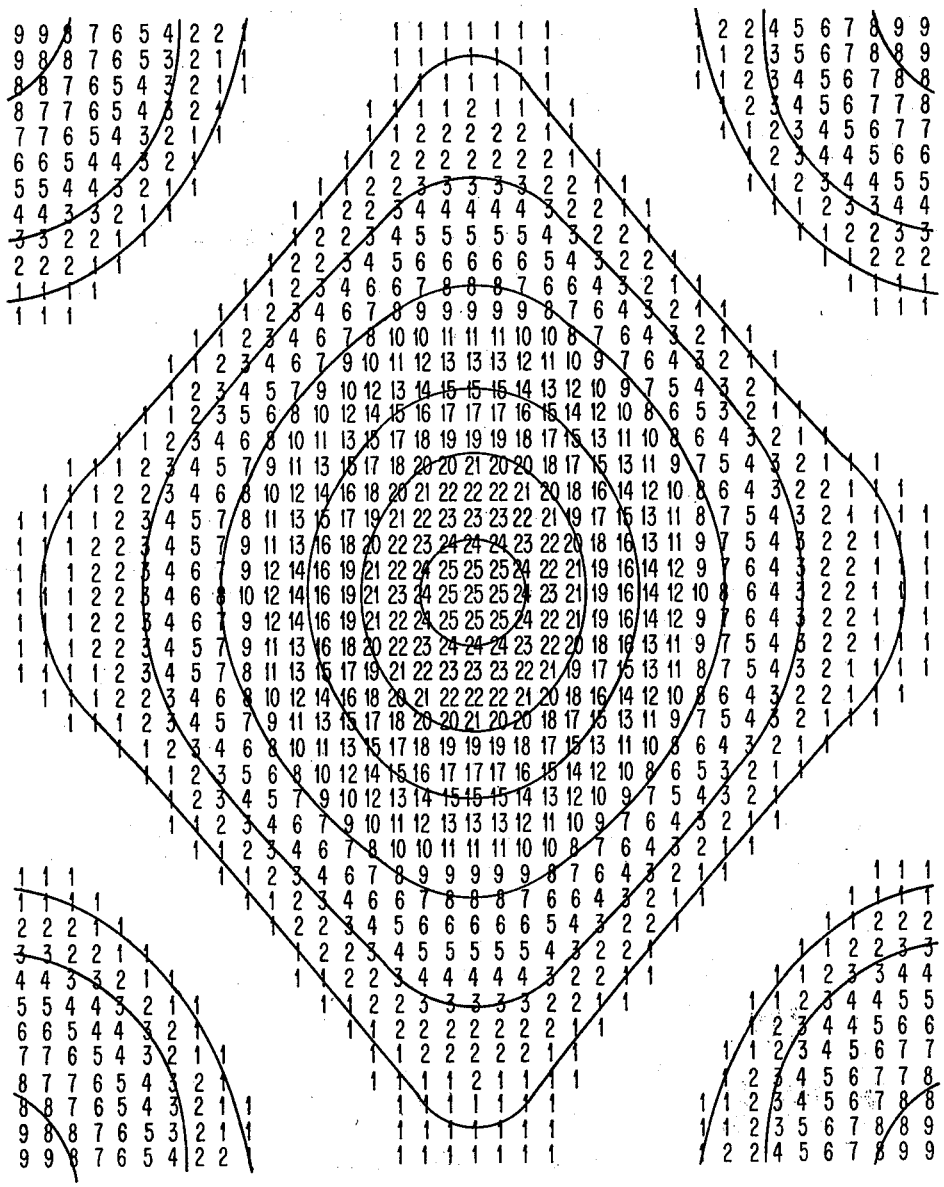
FIGURE 4 is a diagram of a type of smoothing filter, the averaging filter, to be used in a specimen identification system using Fraunhofer diffraction pattern comparison.
Figure 5:
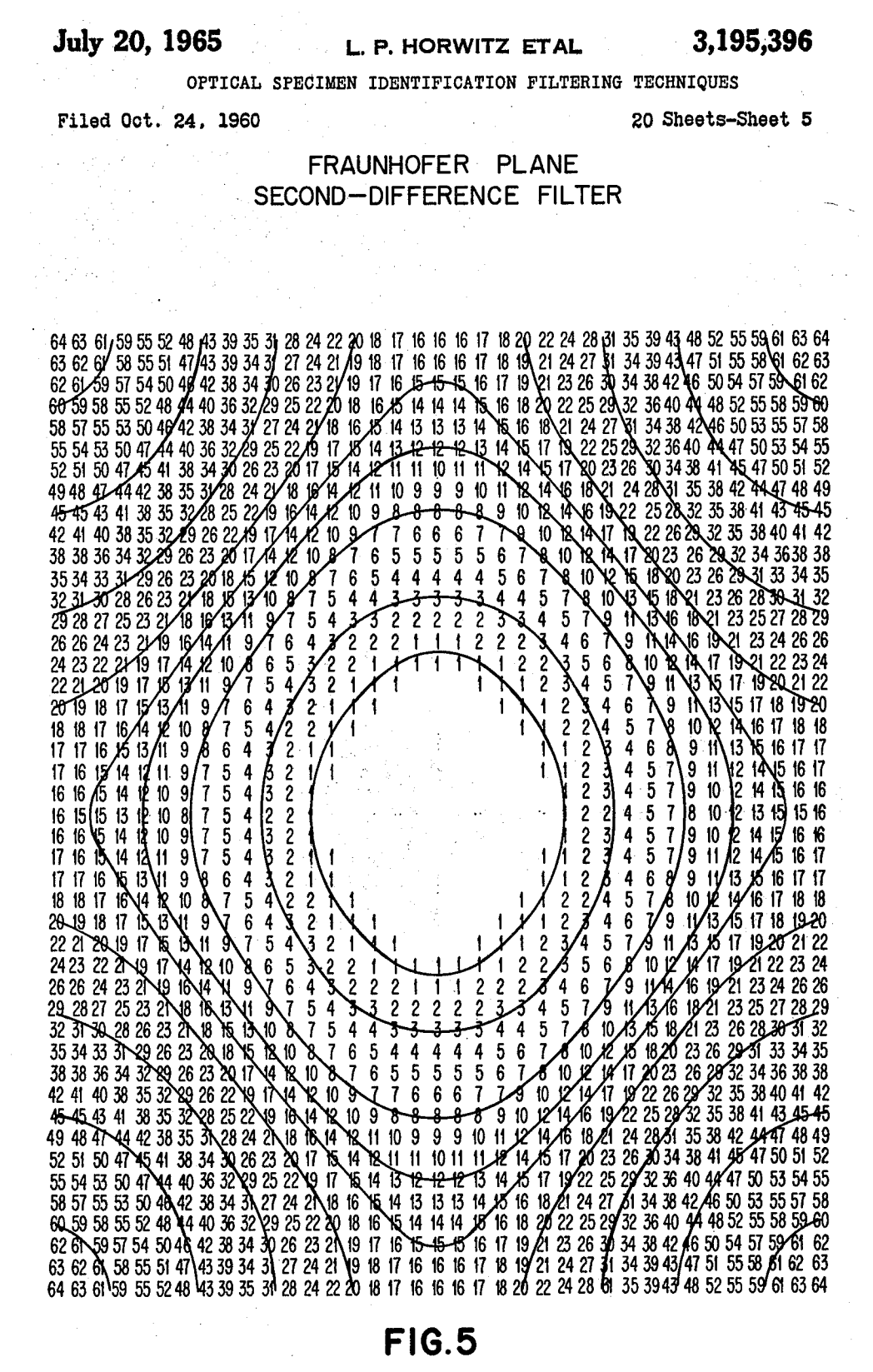

The Fraunhofer pattern comparison system shown in FIGURE 3 uses continuous, rather than discrete, filters. Discrete approximations of an averaging filter and a second-different filter are shown in FIGS. 4 and 5 respectively. Areas containing no numbers are presumed to contain zeroes. The numbers are proportional to the transparency of the filters at the discrete points at which they occur. The higher numbers thus refer to relatively transparent areas. The center of the averaging filter (FIG. 4) is relatively transparent; the center of the second-difference filter (FIG. 5) is relatively opaque. The lines on FIGS. 4 and 5 connect areas of equal transparency. Several techniques are available for converting the discrete approximation into transparencies with continuously varying opacity. Black dots may be placed on a sheet of white paper—the number of dots in any given area being equal to the desired transparency of the filter at the corresponding area. The paper is then photographed slightly out of focus to obtain a negative transparency which approximates the desired filter.

The system shown in FIG. 3 and the filters approximated in FIGS. 4 and 5 provide an example of specimen identification utilizing Fraunhofer patterns as enhanced by filtering techniques.

*(4) Normalization procedures*

Normalization is accomplished to improve the compatibility of the pattern to the reading matrix.

The optical specimen identification systems shown in FIGS. 1, 2 and 3 are normalized to insure that each ideal input pattern causes more light to impinge upon its corresponding photoelectric cell than is caused by non-corresponding patterns. Individual normalization masks, one for each reference pattern, are placed on plates 30 in FIGS. 1, 2 and 3. The normalization masks are uniformly semi-transparent (gray) masks. In the dual channel embodiment of FIG. 2, identical normalization masks are placed in two positions on the plate corresponding to two reference pattern channels. The correct opacity for each normalization mask can easily be achieved by using variable-opacity elements and ideal reference input patterns. One simple variable-opacity element consists of two polarized sheets mounted on a center axis. As one sheet is rotated with respect to the other, the amount of light passing through the sheets is varied.

The opacity of the normalization masks in all embodiments may be set without using the filter 18. In order to determine the opacity of the normalization masks for the embodiments shown in FIGS. 1 and 2, the system in FIG. 1 is used, with the following modifications:

(1) The light source 2 is replaced by a monochromatic point source of light located at a distance from the half-silvered mirror 4 such that the distance between the lens 6 and the half-silvered mirror 4 plus the distance from the half-silvered mirror to the point source equals the focal length of the lens 6.

(2) The reference autocorrelation pattern masks (un-normalized and unfiltered) of the reference patterns are removed from the plate 28 and sequentially used in place of the specimen transparency 8.

(3) A photoelectric cell is placed behind (to the right of) the frosted glass plate 16 such that the total light intensity is measured.

A measurement is recorded of the photocell (item 3, above) current for each reference mask. A variable-opacity normalization mask is then placed between the transparency 8 and the mirror 12. The mask is adjusted to minimum opacity and the reference mask producing the least photoelectric cell 80 current in the preceding procedure is placed in the apparatus. The photoelectric cell current is again measured and recorded for subsequent comparison. The current must be measured at this step in the procedure as the normalization mask, even though adjusted to minimum opacity, may have some opacity. The mask is then removed and placed at one of the two locations in plate 30 corresponding to the reference mask used in this step. The other normalization mask is adjusted in the same manner and placed at the second location corresponding to the reference number used. This procedure is then repeated, using the reference masks for the remaining patterns and their pairs of normalization masks, adjusting each mask to provide photoelectric cell current equal to the current previously recorded. These masks are then placed at their appropriate locations on the plate 30.

The normalization masks for the system using Fraunhofer diffraction pattern comparison, shown in FIG. 3 may be adjusted to the correct opacity according to the following iterative procedure without modifying the system:

(1) With the normalization masks in place on plate 30 and adjusted to minimum opacity, record the photoelectric cell 32 current for each ideal reference input pattern.

(2) Using the reference input pattern that developed the least current, measure the current through the non-corresponding photoelectric cells. If all currents measured are not substantially lower (e.g. 10%) than the current in the corresponding cell, increase the opacity of the appropriate channels until this condition is met.

(3) Repeat the procedure in step 2 using the reference pattern that developed the second lowest current in step 1. If this step indicates the need of more opacity in the channel corresponding to the reference pattern used in step 2, repeat step 2 for the first reference input pattern, decreasing the correlation tolerance (e.g. to 8%) by decreasing the opacity of the channel providing the second-lowest current in step 1. This procedure must be repeated until a tolerance is found that provides proper operation for both reference patterns (i.e. both reference patterns develop substantially more current through their respective photoelectric cells than through any other cells).

(4) Repeat the procedure in step 2 using the remainder of the reference patterns in the order determined by the currents measured in step 1. It may be necessary to return to step 2 and repeat completed work several times, reducing the tolerance each time, before all channels operate properly.

The procedures outlined above are examples of the several available methods for providing indications of the opacity of the normalization masks to be used in the specimen identification system shown in FIGS. 1, 2 and 3.

(5) Maximum signal indicator

FIG. 6 shows a maximum signal indicator 36 that may be used in the apparatus of FIGS. 1, 2 and 3. This circuit is shown with ten inputs, corresponding to the English letters "A" through "J" and may obviously be extended to include the remainder of the alphabet as well as any other desired patterns. D.C. voltage inputs are applied on leads 34 from the preceding apparatus in FIGS. 1, 2 or 3. The purpose of the maximum signal indicator is to produce a signal on the lead 38 that corresponds to the lead 34 having the highest signal level. Reject output 40 contains a signal when there is an insufficient difference in signal levels between the largest and second largest signals on leads 34.

A group of difference amplifiers 62 perform subtraction of the voltage at each input from the voltages at the remaining inputs. A signal is present on lead 64 if $E_A - E_B$ is positive. Similarly, a signal is present on lead 66 if $E_A - E_C$ is positive. A group of inverters 68, designated by blocks labelled I, provides outputs indicative of the reverse of the difference amplifier subtractions. Therefore, no difference amplifier is required for $E_B - E_A$, $E_C - E_A$, etc. This halves the number of difference amplifiers required (compared to the number needed if all subtractions were performed by difference amplifiers and no inverters were used).

A limiting circuit 70, designated in FIG. 6 by the label LIM, is connected to the output of each difference amplifier 62.

FIGURE 7 is a circuit diagram of a limiter that may be used in the circuit of FIGURE 4. Batteries 72 determine the voltage levels at which diodes 74 conduct to limit the input signal. The battery voltages are equal and depend upon the signal input level required to operate the "and" gates 76 (FIG. 6) to which the limiter outputs are applied. The "and" gates 76, designated by the label AND may be formulated by a "Christmas tree" arrangement of any well known variety of two-input "and" gates or a single multiple-input "and" gate, as for example, the type shown in FIG. 13-8 of Jacob Millman and Herbert Taub, Pulse and Digital Circuits, 1956. Nine-lead cables are shown in FIG. 6 rather than nine separate leads, to simplify the drawing. Each limiter 70 output is applied directly to one "and" gate 76 and through an inverter to a second "and" gate.

If any limiter output 70 is negative, zero, or less positive than the "and" gate 76 reference voltage (the voltage which all inputs must equal or exceed to cause the gate to operate), the output of the "and" gate is blocked. This indicates that the reference pattern corresponding to that "and" gate is not similar to the specimen. The "and" gate reference voltage determines the amplitude of the voltages from the difference amplifiers and limiters required for operation. Therefore, this voltage determines the sensitivity of the pattern recognition system as it determines the minimum amount of difference in correlation between the closest and next-closest match that will provide "and" gate operation and thus an indication of identification. The use of limiters preceding the "and" gates provides more stable "and" gate operation. Since the limiter battery voltages are equal to the reference voltage of the "and" gates, all signals are limited to the level necessary to operate the "and" gates.

A reject output signal is developed on lead 40 when no reference pattern is recognized as comparing to the input specimen. This is accomplished by applying the "and" gate outputs 38 through individual inverters 78 to an "and" gate 80. If any output 38 is present the associated inverter 78 produces an inhibit signal to "and" gate 80, inhibiting the reject output 40.

Many less-elaborate maximum signal indicator circuits are available. For example, the input voltage leads 34 may be applied directly to meters to be read by an operator.

(6) Effect of filtering techniques on identification

In order to best illustrate the invention, reference and test patterns "A," "B" and "R" were chosen to show the enhanced identification obtained by utilizing filtering techniques. These patterns have many similarities and hence, are among the most difficult patterns to distinguish. FIG. 8 is a magnified view of the reference patterns on a matrix containing square elements. All three patterns have an enclosed open area above their centers as well as an open area below their centers. The "A" and "R" are additionally similar in that their lower open areas are not enclosed. The "B" and "R" both contain a vertical line on their left sides, as well as other similarities. All three patterns contain serifs to further complicate their identification.

Autocorrelation patterns for the reference patterns "A," "B" and "R" are shown in FIGS. 9, 10 and 11, respectively. These diagrams are discrete versions of the continuous autocorrelation patterns that appear on the frosted glass plate 16 of FIGS. 1 and 2. The numbers in FIGS. 9, 10 and 11 are proportional to light intensity, where the larger numbers indicate the more intense light. The numbers are normalized such that the most intense light is indicated as "100" to facilitate the drawings of equal intensity lines through the diagrams. These lines are drawn corresponding to numbers: 1, 3, 8, 12, 15, 20, 30, 45, 60 and 80 to indicate the general shape assumed by the pattern. The characteristics of the reference patterns "A," "B" and "R" are preserved in the autocorrelation patterns while the vertical and horizontal position of the reference patterns is ignored. It may be noted that the autocorrelation patterns are redundant to the extent that they contain symmetry with respect to their center points.

The effect of a smoothing type of filter, the averaging filter shown in FIG. 1a, is demonstrated by FIGS. 12, 13 and 14 which discretely represent the data that is observable on the frosted glass plate 22 in FIG. 1. Lines are again drawn corresponding to numbers: 1, 3, 8, 12, 15, 20, 30, 45, 60 and 80. The averaging filter tends to cancel many of the irregularities found in the autocorrelation patterns in FIGS. 9, 10 and 11.

The effect of a discriminating type of filter, the second-difference filter, is demonstrated by FIGS. 15, 16 and 17. Since the second difference function contains positive and negative elements, these diagrams are theoretical composite representations of the patterns that would be generated in a system of the type shown in FIG. 1 if negative filtering techniques were available. These composite diagrams are shown, rather than the diagrams of the separated data that is observable on frosted glass plate 22 of FIG. 2 to facilitate an understanding of the effect of the second-difference filter on the autocorrelation patterns. Lines are drawn to separate positive and negative numbers. It may be observed in FIGS. 15, 16 and 17 that the second-difference filter exaggerates the details of the reference patterns and essentially produces an effect opposite to that produced by the averaging filters.

Test patterns "A," "B" and "R" of a different type font than the reference patterns are shown in FIG. 18. There are many readily observable differences between these patterns and the reference patterns shown in FIG. 8.

FIG. 19 contains charts indicating the relative correlation, normalized to 1.000 (for exact correlation), of the reference patterns and test patterns with respect to the reference patterns using unfiltered autocorrelation pattern comparison as well as comparison using autocorrelation patterns as modified by averaging and second-difference filters. It may be seen that each reference pattern, when compared to itself, provides a correlation of 1.000. Identification of reference patterns is greatly accentuated by the use of a second-difference filter as this filter exaggerates the details of the pattern. Discrimination between reference patterns is slightly hampered by the use of the averaging filter.

Identification of test patterns may be enhanced by the use of either a smoothing filter (such as the averaging filter) or a discriminating filter such as the discriminating filter) depending upon the test pattern type font. Generally, use of a smoothing filter produced more reliable results than were obtained either without a filter or with a discriminating filter when the specimens to be identified were of a different font than the reference patterns. The test patterns used to obtain the results in FIG. 17 were all correctly identified when the averaging filter was used. The second-difference filter also provided proper identification for the test patterns "A" and "B," but occasionally produced incorrect identification, as with "R." In many cases, the use of no filter or the use of a second-difference filter provided more accentuated identification than was obtained using the averaging filter because the test and reference patterns were similar in many respects.

The filtering techniques described in Topic 3 for Fraunhofer pattern specimen identification systems provide the same enhanced identification, as accomplished using the autocorrelation pattern filtering techniques described in Topics 2 and 3. The tables in FIG. 19 are also valid for the filtered Fraunhofer pattern system.

*Summary*

The essence of this invention involves the use of optical filtering techniques in registration invariant specimen identification systems to accentuate the class of identifying characteristics upon which identification is to be made. Two general illustrative types of optical filters: smoothing filters and discriminating filters, as embodied by the averaging filter and the second-difference filter have been shown and described. Smoothing filters tend to cancel the effects of specimen irregularities and are especially useful for identification of multi-font specimens. Discriminating filters tend to exaggerate the effects of specimen details and, hence, are useful in identifying specimens in a system where several reference patterns are similar.

The operation of specimen identification systems using autocorrelation pattern and Fraunhofer pattern comparison have been shown to be greatly enhanced by the use of filtering techniques and identification of specimens having similar characteristics have been found to be feasible and practical.

While the invention has been particularly shown and described with reference to preferred embodiments thereof, it will be understood by those skilled in the art that various changes in form and details may be made therein without departing from the spirit and scope of the invention.

What is claimed is:

1. A specimen identification apparatus, comprising, in combination: optical means for generating an autocorrelation pattern of the specimen to be identified; means for enhancing identification comprising a pair of optical filters, one having non-uniform light transmission corresponding to the positive elements and one having non-uniform light transmission corresponding to the absolute values of the negative elements of a bi-polar function which is symmetric about a point, and responsive to the autocorrelation pattern, for generating a pair of filtered autocorrelation patterns; and comparison means for comparing the pair of filtered autocorrelation patterns with autocorrelation patterns of reference patterns for identifying the specimen.

2. A specimen identification apparatus comprising, in combination:
optical means for generating a registration invariant energy pattern dependent upon the shape of the specimen;
and reference pattern comparison means for enhancing identification, comprising filtering means having non-uniform light transmission which is symmetric about a point, responsive to the generated energy pattern for providing an indication of the identity of the specimen.

3. The apparatus described in claim 2, wherein the registration invariant energy pattern is a Fraunhofer pattern.

4. The apparatus described in claim 3, wherein the filtering means suppresses the differences between those generated energy patterns which correspond to specimens having the same identity.

5. The apparatus described in claim 3, wherein the filtering means accentuates the differences between those generated energy patterns which correspond to specimens having different identities.

6. The apparatus described in claim 2, wherein the filtering means suppresses the differences between those generated energy patterns which correspond to specimens having the same identity.

7. The apparatus described in claim 2, wherein the registration invariant energy pattern is an autocorrelation pattern.

8. The apparatus described in claim 7, wherein the filtering means has non-uniform light transmission which corresponds to a smoothing function.

9. The apparatus described in claim 7, wherein the filtering means has non-uniform light transmission which corresponds to an averaging function.

10. The apparatus described in claim 7, wherein the filtering means has non-uniform light transmission which corresponds to a discriminating function.

11. The apparatus described in claim 7, wherein the filtering means has non-uniform light transmission which corresponds to a second-difference function.

12. The apparatus described in claim 2, wherein the filtering means accentuates the differences between those generated energy patterns which correspond to specimens having different identities.

13. The method of identifying a specimen comprising the steps of:
generating an optical, registration invariant energy pattern, dependent upon the shape of the specimen;
optically altering the energy pattern with a filter having a non-uniform positive, real filter function which is symmetric about a point, for enhancing identification;
and comparing the filtered energy pattern to known reference patterns for identifying the specimen.

14. A specimen identification apparatus comprising in combination:
optical means for generating a registration invariant energy pattern dependent upon the shape of the specimen;
and reference pattern comparison means, comprising filtering means having a non-uniform positive, real filter function which is symmetric about a point and arranged to relatively accentuate and suppress specified features of the generated energy pattern, responsive to the generated energy pattern for providing an indication of the identity of the specimen.

15. A method of identifying a specimen comprising the steps of optically generating a Fraunhofer diffraction pattern of the specimen to be identified; optically altering the diffraction pattern with a filter having a non-uniform, positive, real filter function which is symmetric about a point, for enhancing identification; and comparing the filtered diffraction pattern with known reference patterns for identifying the specimen.

16. A method of identifying a specimen comprising the steps of optically generating a Fraunhofer diffraction pattern of the specimen to be identified, and comparing the diffraction pattern with altered Fraunhofer diffraction patterns of reference patterns for identifying the specimen, where the alteration corresponds to a filter function which contains non-uniform, positive, real elements and is symmetric about a point, for enhancing identification.

17. A method of identifying a specimen comprising the steps of optically generating an autocorrelation pattern of the specimen to be identified; optically altering the autocorrelation pattern with a non-uniform filter corresponding to a filter function containing positive, real elements and which is symmetric about a point, for enhancing identification; and comparing the filtered autocorrelation pattern with known reference patterns for identifying the specimen.

18. A method of identifying a specimen comprising the steps of optically generating an autocorrelation pattern of the specimen to be identified; optically altering the autocorrelation pattern with a filter having a non-uniform, positive, real filter function which is symmetric about a point, for enhancing identification; and comparing the filtered autocorrelation pattern with autocorrelation patterns of reference patterns for identifying the specimen.

19. A method of identifying a specimen comprising the steps of optically generating an autocorrelation pattern of the specimen to be identified, and comparing the autocorrelation pattern with altered autocorrelation patterns of reference patterns for identifying the specimen, where the alteration corresponds to a filter function which contains non-uniform, positive, real elements and is symmetric about a point for enhancing identification.

20. A specimen identification apparatus, comprising, in combination: optical means for generating an autocorrelation pattern of the specimen to be identified; means for comparing the autocorrelation pattern with pairs of filtered autocorrelation patterns of reference patterns, where one pattern of each pair corresponds to the autocorrelation pattern of a reference pattern as modified by a filter having light transmission corresponding to the positive elements of a bi-polar filter function that is symmetric about a point and where the other pattern of the pair of patterns corresponds to the autocorrelation pattern of the same reference pattern as modified by a filter having light transmission corresponding to the absolute values of the negative elements of the bi-polar filter function, for enhancing identification; and means for linearly combining the results of each pair of comparisons for identifying the specimen.

21. A specimen identification apparatus comprising, in combination: a surface with a background having a first range of opacities and an area with the approximate shape of the specimen to be identified having a second range of opacities; a source of coherent light directed toward the surface; a non-uniform filter having positive, real elements located behind the surface and corresponding to a filter function which is symmetric about a point, for enhancing identification; a translucent member located behind said filter for developing a diffraction pattern of the specimen; and means for comparing the pattern on the translucent member with patterns dependent upon diffraction patterns of known reference patterns for identifying the specimen.

22. A specimen identification apparatus comprising, in combination: a non-coherent source of light; a surface having a background in a first range of opacities and an area with the approximate shape of the specimen to be identified having a second range of opacities; a partially reflecting mirror positioned to partially reflect light from the source toward the surface; a mirror located behind the surface for reflecting the light passing through the surface back through the surface and through the partially-reflecting mirror toward a translucent member; a non-uniform filter having positive, real elements corresponding to a filter function which is symmetric about a point located between the partially-reflecting mirror and the translucent member, for enhancing identification; and means for comparing the pattern thus developed on the member with patterns dependent upon reference patterns for identifying the specimen.

References Cited by the Examiner
UNITED STATES PATENTS 2,787,188  4/57  Berger _____ 88—14
3,064,519  11/62  Shelton _____ 88—1

OTHER REFERENCES

Howell: "Optical Analog Computers," Journal of the Optical Society of America, vol. 49, No. 10, October 1959, pp. 1012–1021.

JEWELL H. PEDERSEN, *Primary Examiner.*

EMIL G. ANDERSON, *Examiner.*